United States Patent (10) Patent No.: US 11,733,265 B2
Humphris (45) Date of Patent: Aug. 22, 2023

(54) METHOD OF IMAGING A SURFACE USING A SCANNING PROBE MICROSCOPE

(71) Applicant: INFINITESIMA LIMITED, Abingdon (GB)

(72) Inventor: Andrew Humphris, Abingdon (GB)

(73) Assignee: INFINITESIMA LIMITED, Abingdon (GB)

( * ) Notice: Subject to any disclaimer, the term of this patent is extended or adjusted under 35 U.S.C. 154(b) by 0 days.

(21) Appl. No.: 17/767,861

(22) PCT Filed: Oct. 23, 2020

(86) PCT No.: PCT/GB2020/052705
§ 371 (c)(1),
(2) Date: Apr. 8, 2022

(87) PCT Pub. No.: WO2021/079157
PCT Pub. Date: Apr. 29, 2021

(65) Prior Publication Data
US 2023/0030991 A1 Feb. 2, 2023

(30) Foreign Application Priority Data
Oct. 25, 2019 (GB) ...................... 1915539

(51) Int. Cl.
*G01Q 20/02* (2010.01)
*G01Q 10/00* (2010.01)
(Continued)

(52) U.S. Cl.
CPC .......... *G01Q 20/02* (2013.01); *G01Q 10/045* (2013.01); *G01Q 10/065* (2013.01); *G01Q 30/06* (2013.01); *G01Q 40/00* (2013.01)

(58) Field of Classification Search
CPC .... G01Q 20/02; G01Q 10/045; G01Q 10/065; G01Q 30/06; G01Q 40/00
(Continued)

(56) References Cited

U.S. PATENT DOCUMENTS 5,376,790 A 12/1994 Linker et al.
5,448,399 A 9/1995 Park et al.
(Continued)

FOREIGN PATENT DOCUMENTS

WO WO-2009/018575 A2 2/2009
WO WO-2019/002870 A1 1/2019

OTHER PUBLICATIONS

International Search Report issued in PCT Patent Appl. No. PCT/GB2020/052705 dated Feb. 1, 2021.
(Continued)

*Primary Examiner* — Nicole M Ippolito
(74) *Attorney, Agent, or Firm* — Marshall, Gerstein & Borun LLP

(57) ABSTRACT

A method includes scanning a probe laterally across a surface so that the probe follows a scanning motion across the surface and steering a detection beam onto the probe via a steering mirror, the detection beam reflecting from the probe in the form of a return beam. The method also includes moving the steering mirror so that the detection beam follows a tracking motion which is synchronous with the scanning motion and the detection beam remains steered onto the probe by the steering mirror and using the return beam to obtain image measurements, each indicative of a measured height of a respective point on the surface. An associated height error measurement is obtained for each point on the surface, each measurement being indicative of a respective error in the measured height. The height error
(Continued)

measurements are used to correct the image measurements so as to generate corrected image measurements.

11 Claims, 19 Drawing Sheets

(51) Int. Cl.
  *G01Q 30/06* (2010.01)
  *G01Q 40/00* (2010.01)
  *G01Q 10/04* (2010.01)
  *G01Q 10/06* (2010.01)

(58) Field of Classification Search
  USPC .............................................................. 850/6
  See application file for complete search history.

(56) References Cited

U.S. PATENT DOCUMENTS

| | | | |
|---|---|---|---|
| 6,097,473 A * | 8/2000 | Ota | B82Y 10/00 |
| | | | 356/400 |
| 2002/0070355 A1* | 6/2002 | Ota | G03F 9/7003 |
| | | | 430/311 |
| 2007/0188732 A1* | 8/2007 | Shibazaki | G03F 7/70775 |
| | | | 355/75 |
| 2007/0195333 A1 | 8/2007 | Negishi | |
| 2015/0020244 A1 | 1/2015 | Humphris et al. | |
| 2019/0294905 A1 | 9/2019 | Hirade et al. | |

OTHER PUBLICATIONS

Written Opinion issued in PCT Patent Appl. No. PCT/GB2020/052705 dated Feb. 1, 2021.

* cited by examiner

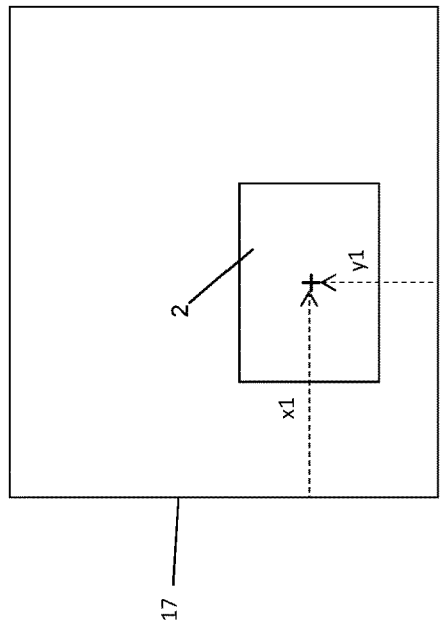
FIG. 4
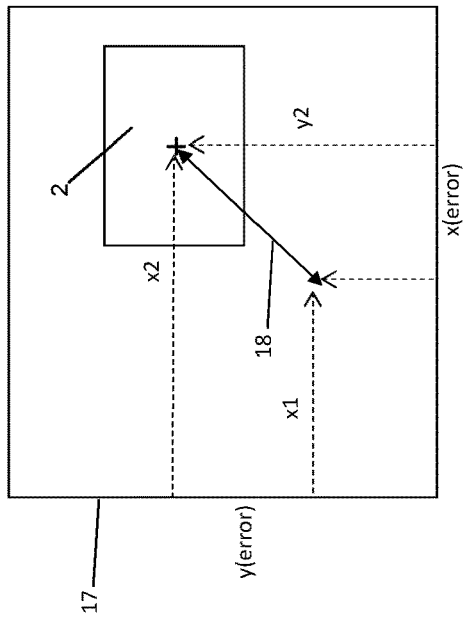
FIG. 5
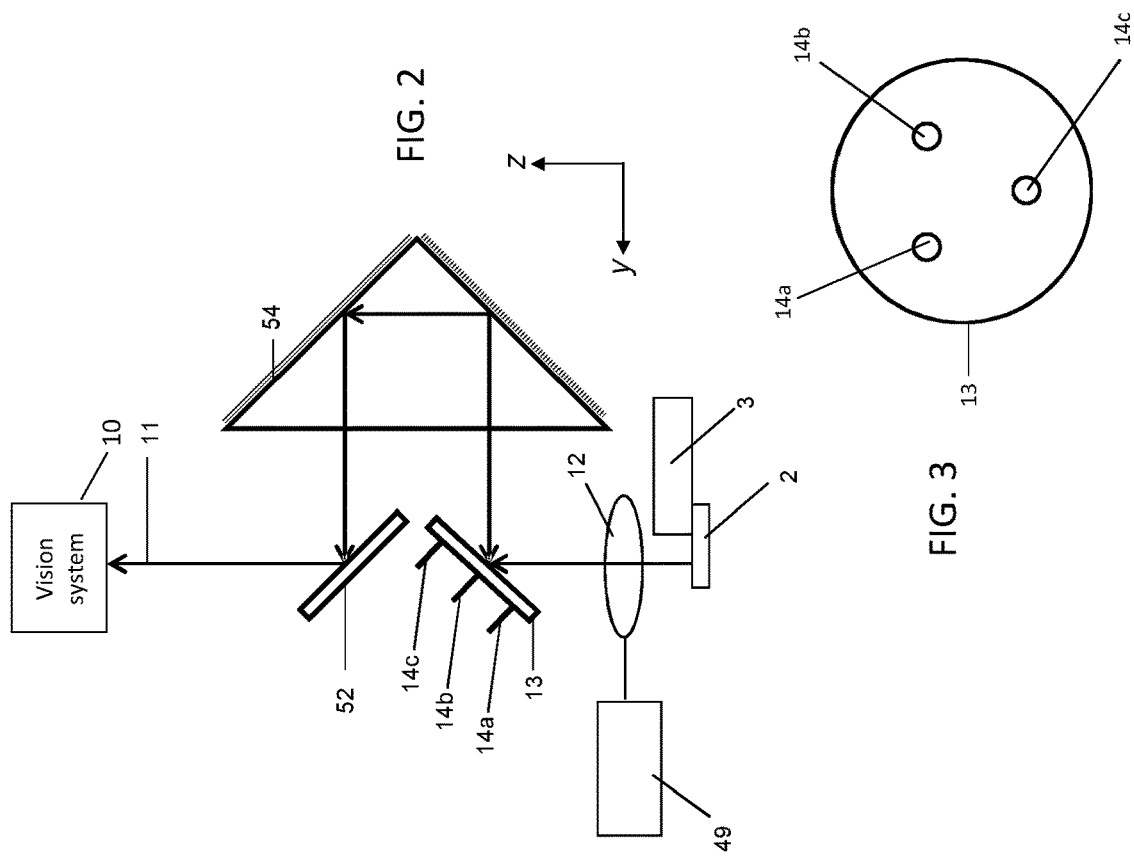
FIG. 2
FIG. 3

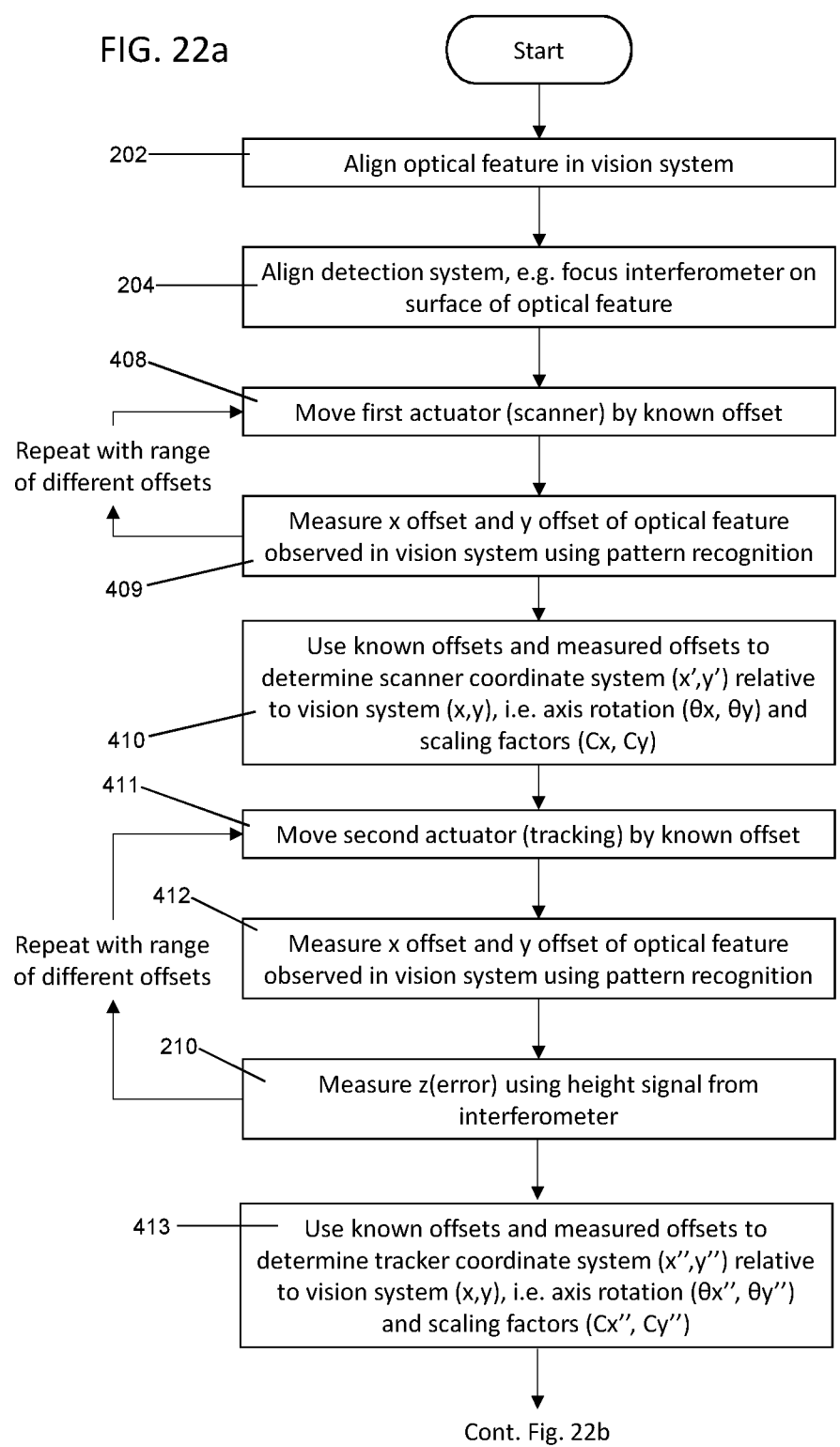

| -X,Y | 0,Y | X,Y |
|------|-----|-----|
| -X,0 | 0,0 | X,0 |
| -X,-Y | 0,-Y | X,-Y |

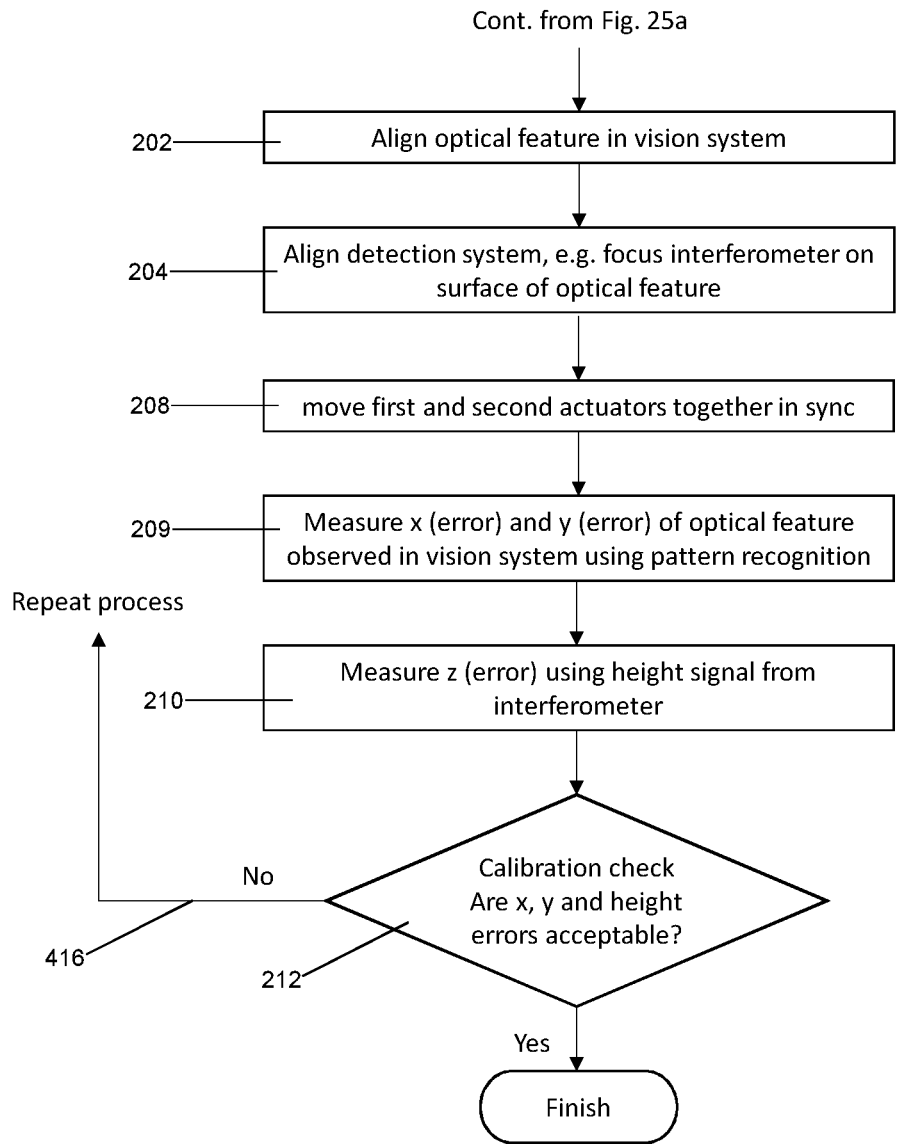

METHOD OF IMAGING A SURFACE USING A SCANNING PROBE MICROSCOPE

FIELD OF THE INVENTION

The present invention relates to a method of imaging a surface using a scanning probe microscope and to a scanning probe microscope.

BACKGROUND OF THE INVENTION

A scanning probe microscope is disclosed in US2015/0020244. A lens is arranged to receive a beam and focus it onto a probe. A scanning system varies over time the angle of incidence at which the beam enters the lens relative to its optical axis. The scanning system is typically arranged to move the beam so as to track movement of the probe, thereby maintaining the location on the probe at which the beam is focused. The scanning system may comprise a beam steering mirror which reflects the beam towards the lens; and a mirror actuator for rotating the beam steering mirror.

An atomic force microscope is disclosed in US2007/0195333. A surface shape of a member to be measured is measured by reflecting measuring light at a reflection surface of a probe and utilizing an atomic force exerting between the probe and the member to be measured. In addition to a first scanner for driving the probe, a second scanner for moving a focus position of an optical system is provided. Position conversion data representing a correlation between amounts of control of the first scanner and the second scanner are obtained in advance. By synchronously driving the first scanner and the second scanner, the focus position of the optical system is caused to follow the probe to improve measurement accuracy.

WO2019/002870 provides a scanning probe microscope comprising: a first actuator configured to move a feature so that the feature follows a scanning motion; a steering element; a vision system configured to collect light from a field of view to generate image data, wherein the field of view includes the feature and the light from the field of view travels from the feature to the vision system via the steering element; a tracking control system configured to generate one or more tracking drive signals in accordance with stored reference data; a second actuator configured to receive the one or more tracking drive signals and move the steering element on the basis of the one or more tracking drive signals so that the field of view follows a tracking motion which is synchronous with the scanning motion and the feature remains within the field of view; an image analysis system configured to analyse the image data from the vision system to identify the feature and measure an apparent motion of the feature relative to the field of view; and a calibration system configured to adjust the stored reference data based on the apparent motion measured by the image analysis system.

SUMMARY OF THE INVENTION

A first aspect of the invention provides a method of imaging a surface using a scanning probe microscope, the scanning probe microscope comprising a probe having a cantilever extending from a base to a free end, and a probe tip carried by the free end of the cantilever, and a steering mirror; the method comprising: scanning the probe laterally across the surface so that the probe follows a scanning motion across the surface; steering a detection beam onto the probe via the steering mirror, the detection beam reflecting from the probe in the form of a return beam; moving the steering mirror so that the detection beam follows a tracking motion which is synchronous with the scanning motion and the detection beam remains steered onto the probe by the steering mirror; using the return beam to obtain image measurements, each image measurement being indicative of a measured height of a respective point on the surface; obtaining an associated height error measurement for each point on the surface, each height error measurement being indicative of a respective error in the measured height; and using the height error measurements to correct the image measurements so as to generate corrected image measurements.

Scanning the probe typically comprises performing a scan, such that a number of points on the surface are imaged/analysed over the course of the scan. The steering mirror may be moved based on one or more scanning command signals that are indicative of the intended position or orientation of the steering mirror.

Obtaining an associated height error measurement may comprise determining an intended position or orientation of the steering mirror based on the scanning command signal(s); measuring a real position or orientation of the steering mirror; and calculating a mirror error measurement indicative of a difference between the intended position or orientation and the real position or orientation, wherein the associated height error measurement is based on the mirror error measurement.

Obtaining an associated error measurement may further comprise applying a sensitivity parameter to the mirror error measurement.

Applying the sensitivity parameter to the difference may comprise multiplying or dividing the mirror error measurement by the sensitivity parameter.

The sensitivity parameter may be determined by moving the steering mirror by a known amount; determining an observed change in measured height; and dividing the known amount by the observed change or vice versa.

The image measurement and the associated error measurement may be obtained at the same time.

Multiple height error measurements are obtained over the course of the scan and used to correct their associated image measurements. Further image measurements may be made during the scan which are not corrected and/or do not have associated height error measurements, but more preferably all image measurements made during the scan are corrected.

The step of using the height error measurements to correct the image measurements may take place in post processing after the scan has completed. Alternatively the image measurements may be corrected in real time, as the scan is taking place.

The associated height error measurements may be obtained by filtering the mirror error measurements, for instance with a low pass filter, typically in post processing after the scan has completed and all of the mirror error measurements have been calculated. Alternatively, the filtering may occur in real time as the scan is taking place.

Moving the steering mirror may comprise translating and/or rotating the steering mirror.

A second aspect of the invention provides a scanning probe microscope comprising: a probe having a cantilever extending from a base to a free end, and a probe tip carried by the free end of the cantilever; a scanner arranged to scan the probe laterally across the surface so that the probe follows a scanning motion across the surface; a steering mirror arranged to steer a detection beam onto the probe, the detection beam reflecting from the probe in the form of a return beam; one or more actuators arranged to move the steering mirror so that the detection beam follows a tracking motion which is synchronous with the scanning motion and the detection beam remains steered onto the probe by the steering mirror; and a processing system arranged to: use the return beam to obtain an image measurement for a point on the surface, the image measurement being indicative of a measured height of the point on the surface; obtain an associated height error measurement for the point on the surface, the height error measurement being indicative of an error in the measured height; and use the height error measurement to correct the image measurement so as to generate a corrected measurement.

In one embodiment the processing system comprises a tracking controller, and an image collection processor. The processing system may be implemented in software, or in dedicated hardware such as one or more digital signal processors.

The probe microscope may be used in a number of applications, including (but not limited to): material science and biological research, industrial inspection, semiconductor wafer and mask inspection and review; biosensing to detect multiple biomarkers; nanolithography, such as, dip pen nanolithography in which scanning probes deposit chemical compounds on a substrate; or data storage in which the probe has a heater allowing its temperature to be independently raised to melt a polymer substrate followed by an imprinting action by the probe producing a dent representing a binary digit.

Typically the scanning probe microscope is operable to obtain information from a sample with a probe. The information obtained from the sample may be topographic information or any other kind of information (such as chemical and mechanical information about the sample or surface of the sample). The probe and microscope may be further adapted to measure other sample properties, such as magnetic or electric fields, via suitable interaction forces. Alternatively the scanning probe microscope may be operable to manipulate or modify a sample with the probe, for instance by removing or adding material such as to deposit chemical compounds on the sample or store data on the sample.

BRIEF DESCRIPTION OF THE DRAWINGS

Embodiments of the invention will now be described with reference to the accompanying drawings, in which:

FIG. 2 shows more detail of the scanning probe microscope being operated in the calibration mode;

FIG. 3 is a view of the second actuator and the steering mirror;

FIG. 4 shows the field of view of the vision system;

FIG. 5 shows the field of view of the vision system after the steering mirror and the probe support have been moved;

FIGS. 22a and 22b show a method of operating the scanning probe microscope in an alternative calibration mode;

FIGS. 25a and 25b show a method of operating the scanning probe microscope in a further alternative calibration mode.

DETAILED DESCRIPTION OF EMBODIMENT(S)

Figure 1:
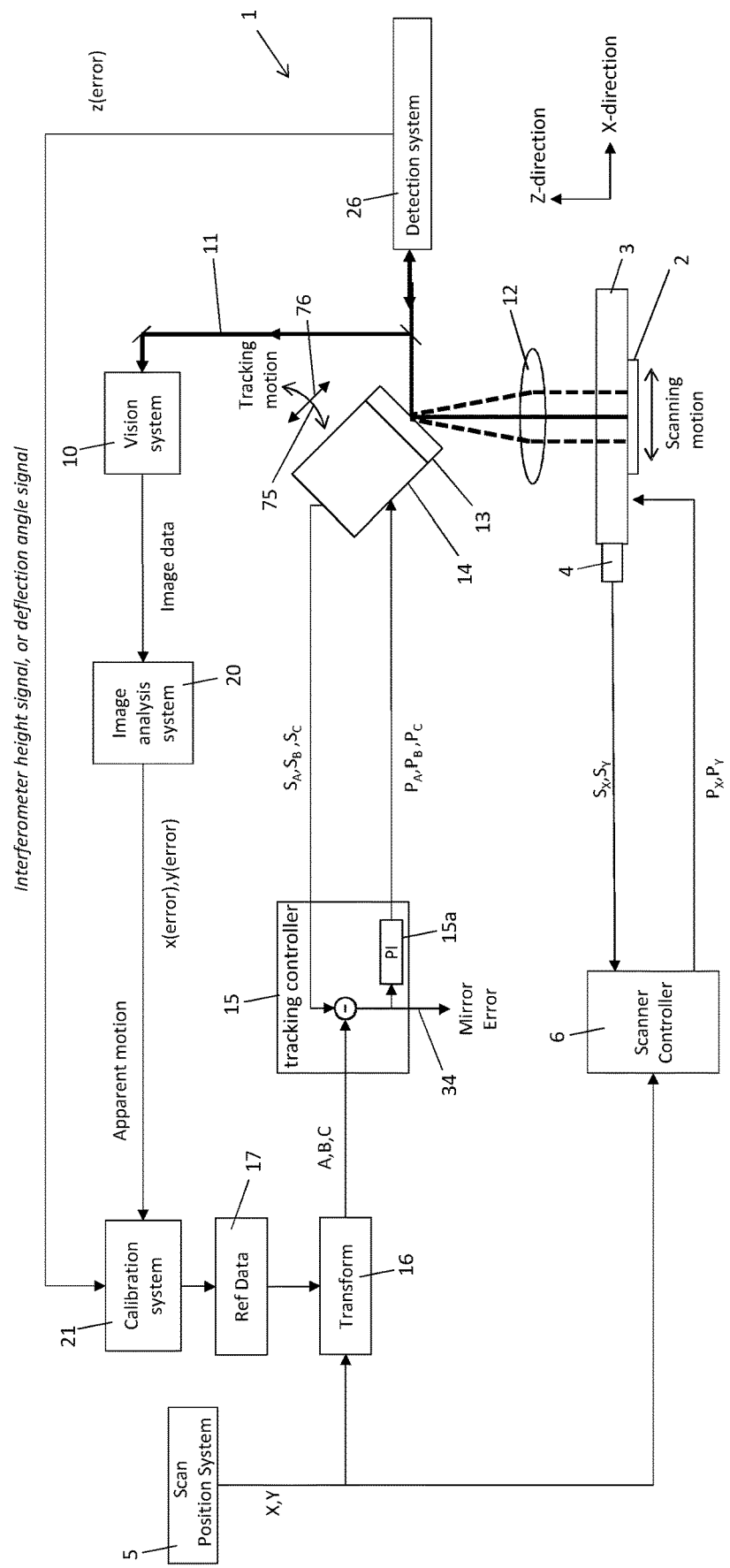
FIG. 1 shows various parts of a scanning probe microscope which are used in a calibration mode.

FIG. 1 shows a scanning probe microscope 1. The microscope comprises a probe support 2 carried by a first actuator 3, which is typically a piezoelectric actuator. The first actuator 3 is configured to generate a scanning motion in a horizontal (X,Y) plane. The X-component of the scanning motion is driven by a scanner drive signal $P_x$, and the Y-component of the scanning motion is driven by a scanner drive signal $P_y$. The first actuator 3 can also generate motion in the vertical (Z) direction.

Figure 6:
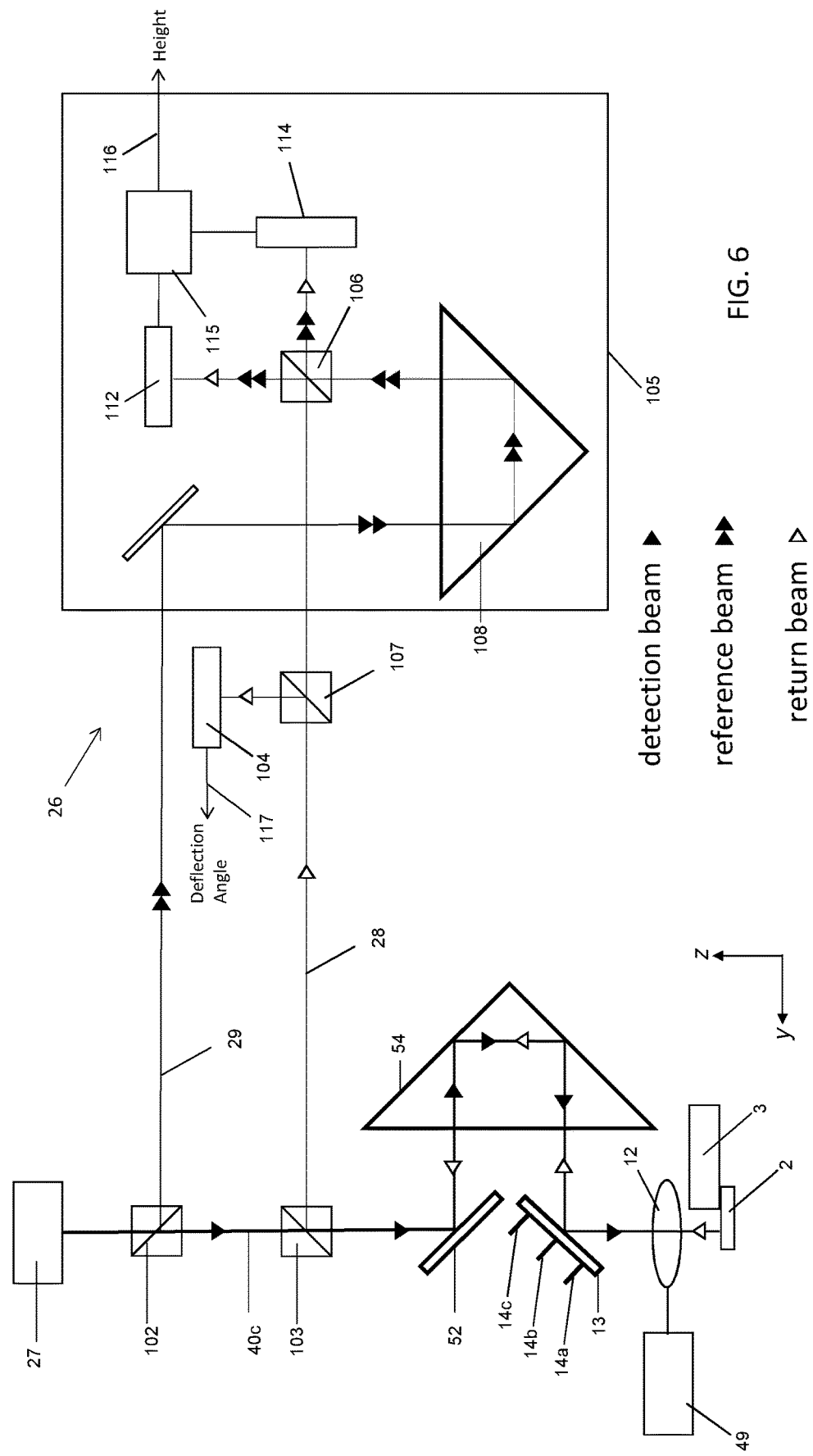
FIG. 6 shows the detection system in detail.
Figure 8:
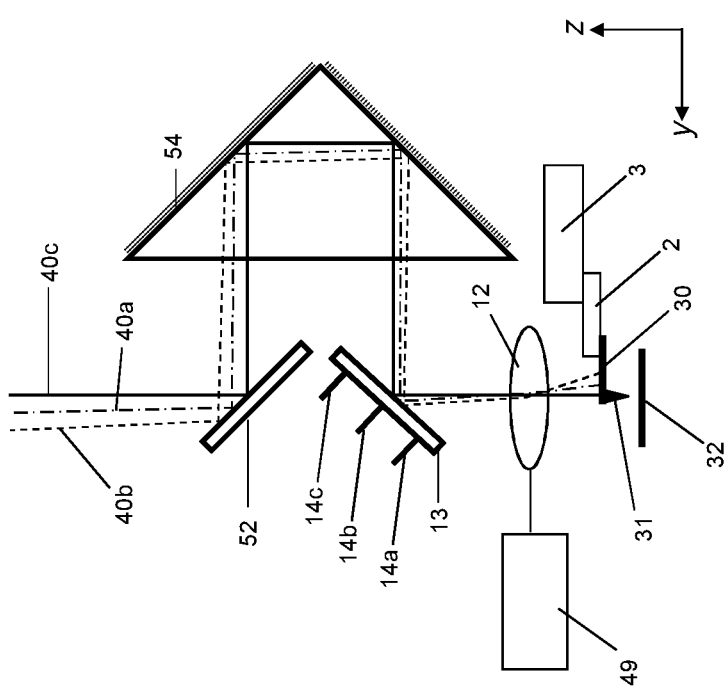
FIG. 8 shows various parts of the scanning probe microscope being operated in an imaging mode.
Figure 10:
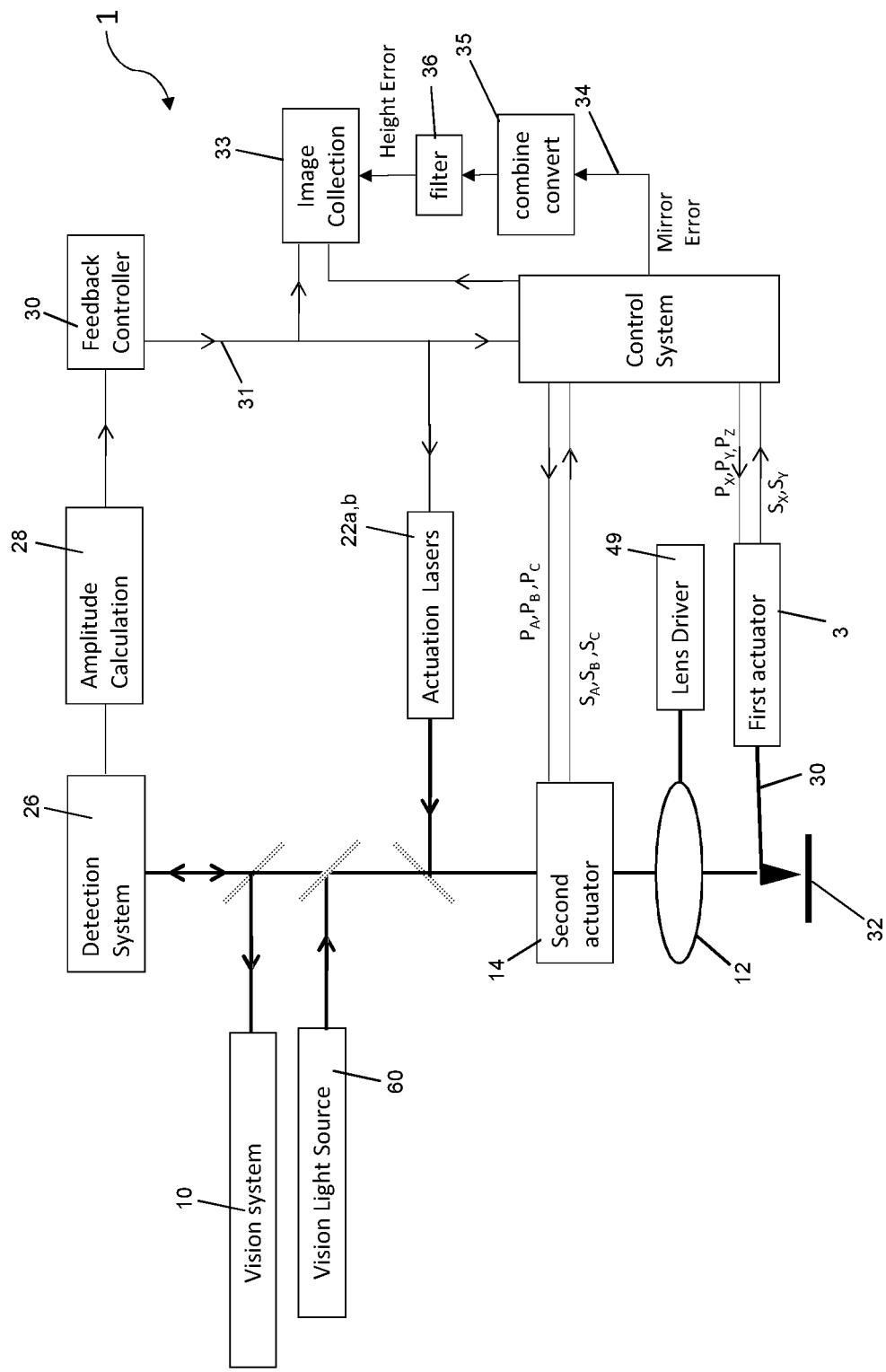
FIG. 10 shows various other elements of the microscope which are used when it is operated in the imaging mode.

The microscope 1 can be operated in a calibration mode shown in FIGS. 1, 2 and 6 without a probe, or in an imaging mode shown in FIGS. 8 and 10 with a probe. The calibration mode will be described first.

A scanner sensor 4 such as an interferometer, capacitance sensor or LVDT sensor detects the position of the first actuator 3 to provide scanner position feedback signals— one of the signals $S_x$ indicating the sensed X-position, the other signal $S_y$ indicating the sensed Y-position.

A scan position system 5 generates scanning command signals X,Y: one of the scanning command signals X indicating a desired X-position of the first actuator 3, the other scanning command signal Y indicating a desired Y-position of the first actuator 3. A scanner controller 6 generates the scanner drive signals Px,Py on the basis of the scanning command signals X,Y and the scanner position feedback signals Sx,Sy. This feedback loop ensures that the first actuator 3 drives the probe support 2 to a desired position.

A vision system 10 is arranged to collect light 11 from a field of view to generate image data. The vision system 10 may comprise a CCD array for example. The field of view in the calibration mode shown in FIGS. 1, 2 and 6 is centred on the probe support 2. The light 11 from the field of view travels from the probe support 2 to the vision system 10 via an objective lens 12 and a steering mirror 13, as well as various other optical elements shown in FIGS. 2 and 9 but omitted from FIG. 1.

The steering mirror 13 is mounted to a second actuator 14. The second actuator 14 is configured to move the steering mirror 13 on the basis of tracking drive signals $P_A, P_B, P_C$ so that the field of view of the vision system 10 follows a tracking motion which is synchronous with the scanning motion, and the probe support 2 remains centred within the field of view.

The second actuator 14 comprises three piezoelectric actuator struts 14a-c shown in FIG. 2. The struts 14a-c are separated by 120° round the centre of the steering mirror 13 as shown in FIG. 3. The lengths of the three struts 14a-c can be adjusted together to translate the mirror 13, or at different rates to rotate the mirror 13 about two orthogonal axes.

Each one of the struts 14a-c extends and contracts on the basis of a respective tracking drive signal. So the strut 14a is driven by the tracking drive signal $P_A$, the strut 14b is driven by the tracking drive signal $P_B$ and the strut 14c is driven by the tracking drive signal $P_C$.

As explained in detail below, a tracking control system 15, 16 is configured to generate the tracking drive signals $P_A, P_B, P_C$ in accordance with stored reference data 17 and the scanning command signals X,Y. The tracking control system comprises a tracking controller 15 and a transform system 16.

Each one of the struts 14a-c has an associated strain gauge which generates a strain gauge feedback signal $S_A, S_B, S_C$. The tracking controller 15 generates the tracking drive signals $P_A, P_B, P_C$ on the basis of a set of tracking command signals A,B,C and the strain gauge feedback signals $S_A, S_B, S_C$. This feedback loop ensures that the second actuator 14 drives the steering mirror 13 to a desired position determined by the tracking command signals A,B,C.

Alternatively the feedback signals $S_A, S_B, S_C$ may be provided by an interferometer, capacitance sensor or LVDT sensor instead of by strain gauges.

The tracking command signals A,B,C are generated by a transform system 16 which converts the scanning command signals X,Y in the "X,Y" coordinates of the scan position system 5 into the "A,B,C" coordinates required to drive the second actuator 14. The transform system 16 performs this conversion on the basis of reference data 17 which is stored in a memory. This reference data 17 is typically in the form of a matrix of reference values.

The various functional elements of the microscope shown in FIG. 1 (that is, elements 5,6,15,16,20 and 21) may be implemented in computer software running on one or more computer processors, or in dedicated hardware.

FIG. 4 is a schematic drawing showing the field of view 17 of the vision system 10, in this case showing the probe support 2. The probe support 2 has a marker on its upper surface, indicated by a cross (+) in FIGS. 4 and 5. An image analysis system 20 shown in FIG. 1 is configured to analyse the image data from the vision system 10 to identify the marker and measure an apparent motion of the marker relative to the field of view 17. An example of apparent motion relative to the field of view 17 is illustrated by the position of the marker changing from a position x1, y1 in FIG. 4 to a position x2, y2 in FIG. 5. The offset between the two positions is indicated at 18. Put another way, the image of the marker has moved from one pixel to another pixel in the CCD array of the vision system 10.

Returning to FIG. 1: a calibration system 21 is programmed to adjust the stored reference data 17 in order to minimise the apparent motion measured by the image analysis system 20 as the first and second actuators are driven. Initially the reference data 17 is based only on the known geometry of the various parts, so the tracking motion of the field of view of the vision system 10 will not precisely follow the scanning motion of the probe support 2, resulting in a large apparent motion as shown in FIGS. 4 and 5. The calibration system 21 implements an iterative optimisation process in which it adjusts the reference data 17 until the apparent motion of the marker has reduced to an acceptable amount. In an ideal scenario the apparent motion will be reduced to zero, so the image of the marker does not change at all within the field of view as the probe support is scanned. Details of the iterative optimisation process will be described later with reference to FIG. 7.

A detection system 26, shown schematically in FIG. 1 and in further detail in FIG. 6, includes a laser light source 27 which generates a detection beam 40c which is steered onto the probe support 2 by the steering mirror 13. The probe support 2 reflects the detection beam 40c to generate a return beam 28 shown in FIG. 6.

The detection beam 40c is reflected from a fixed mirror 52 towards a right-angle block 54. The right angle block is oriented such that the beam 40c is incident normally on the entry face. The detection beam 40c propagates to the steering mirror 13 and is reflected towards the objective lens 12. As the steering mirror 13 tilts, the reflected detection beam 40c rotates, with the result that the angle and point of incidence of the detection beam 40c into the objective lens 12 changes. Synchronisation of the angle of the steering mirror 13 with the scanning pattern followed by the probe support 2 as it is driven by the first actuator 3 means that the detection beam 40c retains its position on the probe support 2.

The light from the laser light source 27 is split by a beam splitter 102 into the detection beam 40c and a reference beam 29. The return beam 28 is directed into the detection system 26 by a second beam splitter 103. The return beam 28 is then split by a third beam splitter 107 into a first component which falls on a split photodiode 104, and a second component which is directed into an interferometer 105.

The split photodiode 104 is a position sensitive detector which generates an output 117 in accordance with an offset of the first component of the return beam 28 relative to the split photodiode 104. This output 117 is referred to below as a deflection signal 117 because it is indicative of a deflection angle of a cantilever when the microscope is operated in the imaging mode which will be described later. Typically the split photodiode 104 is split into four quadrants, the ratios between the signals from the four quadrants indicating offsets in X and Y of the first component of the return beam 28 relative to the split photodiode 104.

Inside the interferometer 105, the second component of the return beam 28 is split by a beam splitter 106. The reference beam 29 is directed onto a retroreflector 108 and thereafter to the beam splitter 106. The retroreflector 108 is aligned such that it provides a fixed optical path length relative to the vertical (z) position of the probe support 2—in other words the height of the probe support 2. The beamsplitter 106 has an energy absorbing coating and splits both the return beam 28 and the reference beam 29 to produce first and second interferograms with a relative phase shift of ~90°. The two interferograms are detected respectively at photodetectors 112, 114.

Ideally, the photodetector signals are complementary sine and cosine signals with a phase difference of 90°. Further, they should have no dc offset, have equal amplitudes and only depend on the position of the cantilever and wavelength $\lambda$ of the laser. Known methods are used to monitor the outputs of the photodetectors 112, 114 while changing the optical path difference in order to determine and to apply corrections for errors arising as a result of the two photodetector signals not being perfectly harmonic, with equal amplitude and in phase quadrature. Similarly, dc offset levels are also corrected in accordance with methods known in the art.

These photodetector signals are suitable for use with a conventional interferometer reversible fringe counting apparatus and fringe subdividing apparatus, which may be provided as dedicated hardware or as a programmed computer. Phase quadrature fringe counting apparatus is capable of measuring displacements in the position of the cantilever to an accuracy of $\lambda/8$. That is, to 66 nm for 532 nm light. Known fringe subdividing techniques, based on the arc tangent of the signals, permits an improvement in accuracy to the nanometre scale or less. Interferometric methods of extracting the path difference between two coherent beams are well known in the art and so will not be described in any further detail. In FIG. 6 a processor 115 is shown which receives the signals from the photodetectors 112, 114 and performs the fringe counting and subdividing mentioned above to generate an output 116, which will be referred to below as a height signal 116 since it is indicative of a height of a probe when the microscope is operated in the imaging mode as described in further detail below.

As described above, the calibration system 21 is programmed to adjust the stored reference data 17 in order to minimise the variation in the apparent motion measured by the image analysis system 20—such apparent motion being indicative of an error in the scanning motion imparted to the steering mirror 13. It has been realised that errors in the scanning motion will also result in a variation in the height signal 116 from the interferometer and also a variation in the deflection signal 117 from the split photodiode 104. Therefore the calibration system 21 is also configured to adjust the stored reference data 17 in order to minimise these variations in the height signal 116 and/or the deflection signal 117.

Figure 7:
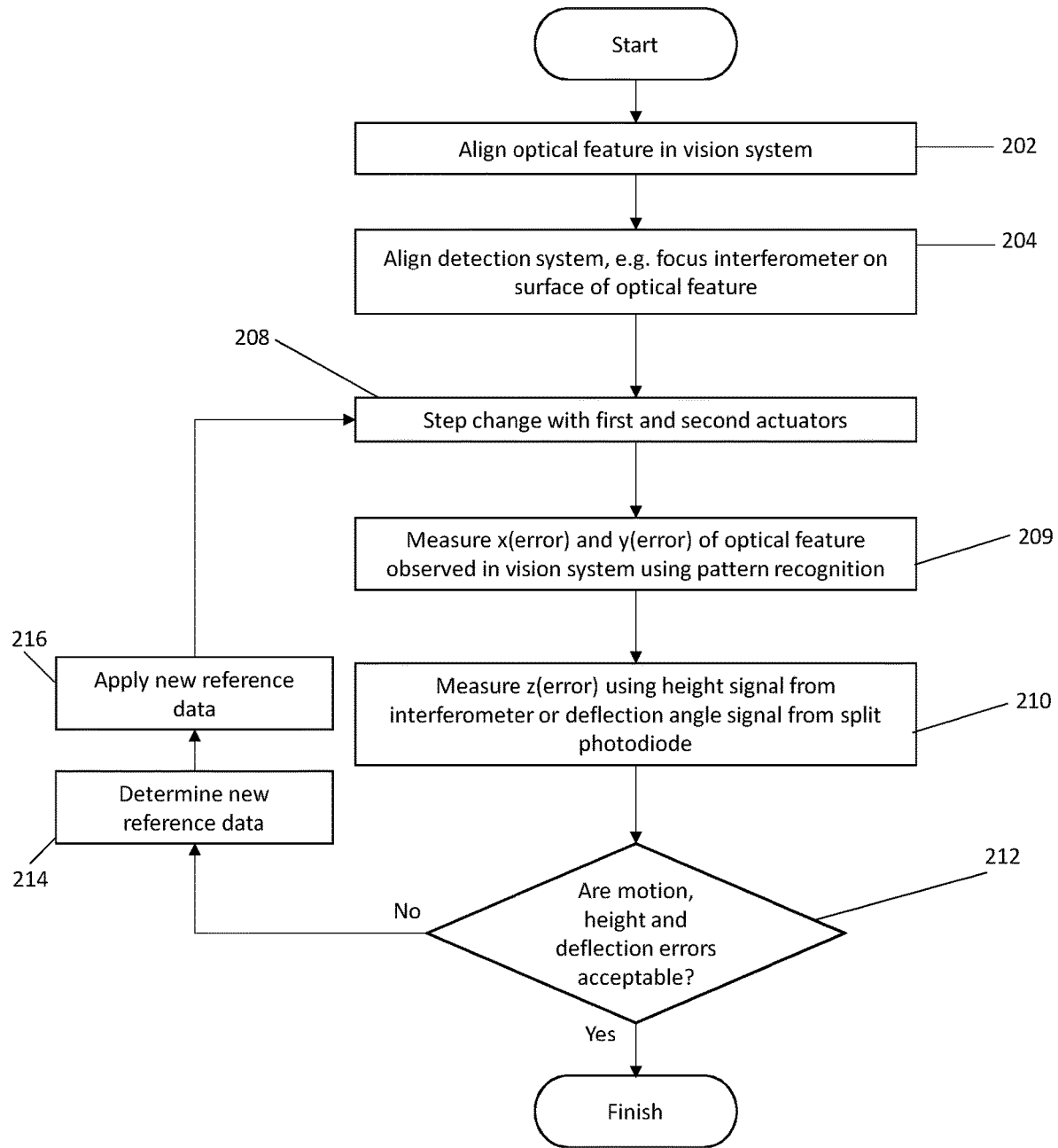
FIG. 7 is a flow diagram of the calibration process.

FIG. 7 shows the steps of the calibration process in detail. In step 202 an optical feature is aligned in the field of view of the vision system 10. So for example, with reference to FIG. 2, the optical feature could be the marker (+), and the steering mirror 13 is moved until the marker is centred within the field of view 17.

The detection system 26 is aligned in step 204 so that the interferometer 105 is focused on the surface of the probe support 2. This is achieved by moving the probe support 2 up and down repeatedly in the Z-direction with the first actuator 3, and monitoring the amount of intensity variation in the signals from the photodetectors 112, 114 as the objective lens 12 is moved gradually in the Z-direction by a lens driver 49 (shown in FIG. 2), which is typically a motor. This amount of intensity variation is indicative of a level of interferometer contrast, and when the interferometer contrast is maximised then the objective lens 12 is at the correct Z-position and the interferometer 105 is focused on the surface of the probe support 2.

In step 208 the scan position system 5 changes the scanning command signals X,Y by $\Delta X$ and $\Delta Y$ respectively. This causes the first actuator 3 to generate a step change $(\Delta X, \Delta Y)$ in the position of the probe support 2 and the second actuator 14 to generate a step change $(\Delta A, \Delta B, \Delta C)$ in the position or orientation of the tracking mirror 13. Note that these two step changes $(\Delta X, \Delta Y)$ and $(\Delta A, \Delta B, \Delta C)$ may be generated simultaneously, or one after the other.

The tracking command signals (A,B,C) used in step 208 of the calibration mode are generated by transforming the scanning command signals (X,Y) used in step 208 of the calibration mode in accordance with provisional reference data 17.

In an ideal scenario, the provisional reference data 17 is perfectly accurate so that the apparent position of the probe support 2, and any other features which are being moved by the first actuator 3, will not change for the vision system 10. In step 209 the apparent motion of the marker relative to the field of view 17 of the vision system 10 caused by the step changes $(\Delta X, \Delta Y)$ and $(\Delta A, \Delta B, \Delta C)$ is determined by the image analysis system 20. An example of such apparent motion relative to the field of view 17 is illustrated by the position of the marker changing from a position x1,y1 in FIG. 4 to a position x2,y2 in FIG. 5. The offset 18 gives an error in the X-direction which is denoted x(error) in FIGS. 1, 5 and 7 and an error in the Y-direction which is denoted y(error) in FIGS. 1, 5 and 7.

Variation in the height signal 116 from the interferometer 105 or the deflection angle signal 117 from the split photodiode 104 is determined in step 210—this variation being denoted as z(error) in FIGS. 1 and 7.

If x(error), y(error) and z(error) are all determined to be below an acceptable threshold in step 212 then the calibration process is finished. If one or more of these errors is too high, then new reference data is determined at step 214, and in step 216 the reference data 17 is adjusted by applying the new reference data.

The X,Y error values x(error), y(error) are used to change the rotary movement of the steering mirror 13, denoted by arrow 75 in FIG. 1; and the Z error value z(error) is used to the change the translational movement of the steering mirror 13, denoted by an arrow 76 in FIG. 1.

Step 208 is then repeated—either repeating the previous step change $(\Delta X, \Delta Y)$ or reversing it by $(-\Delta X, -\Delta Y)$ to return the probe support 2 to its previous position.

In the calibration process of FIG. 7, apparent motion of the probe support 2 is caused by step changes $(\Delta X, \Delta Y)$ and $(\Delta A, \Delta B, \Delta C)$ which may or may not be performed simultaneously, and errors x(error), y(error) and z(error) are measured and reduced. In an alternative calibration process the scanning command signals X,Y may be varied continuously during the calibration process, rather than in a step-by-step fashion. Snapshots of the probe support 2 are taken by the vision system 10 and analysed by the image analysis system 20 to determine the apparent motion in X and Y (giving a stream of error values x(error), y(error)) and an associated stream of z(error) values are taken from the detection system 26.

When the scanning probe microscope has been calibrated as in FIG. 7, then it can be used in an imaging mode with a probe 30,31 mounted to the probe support 2 as shown in FIGS. 8 and 10. The calibration process of FIG. 7 may be performed with or without the probe 30, 31 mounted to the probe support 2. If there is a probe during the calibration process, then the calibration process described above may use the probe 30,31 rather than the probe support 2 as the scanning feature which is observed during the calibration process. If there is no probe during the calibration process, as shown in FIGS. 1, 2 and 6, then once the probe has been mounted to the probe support as shown in FIG. 8 then the first actuator 3 is driven to move the probe 30,31 into the position previously occupied by the probe support 2 so that the probe is in the centre of the field of view 17 of the vision system and the detection beam 40c is incident on the probe rather than the probe support 2 during the imaging mode.

The probe comprises a cantilever 30 and a tip 31. The tip 31 tapers to a fine point and is located towards a distal end of the cantilever 30. The other (proximal) end of the cantilever is fixed to the probe support 2. The cantilever 30 is of a type referred to as a thermal bimorph. That is, it is composed of two (or more) materials, with differing thermal expansions. Typically, this will be a silicon or silicon nitride base with a gold or aluminium coating. The coating extends the length of the cantilever and covers the reverse side from the tip.

Figure 9:
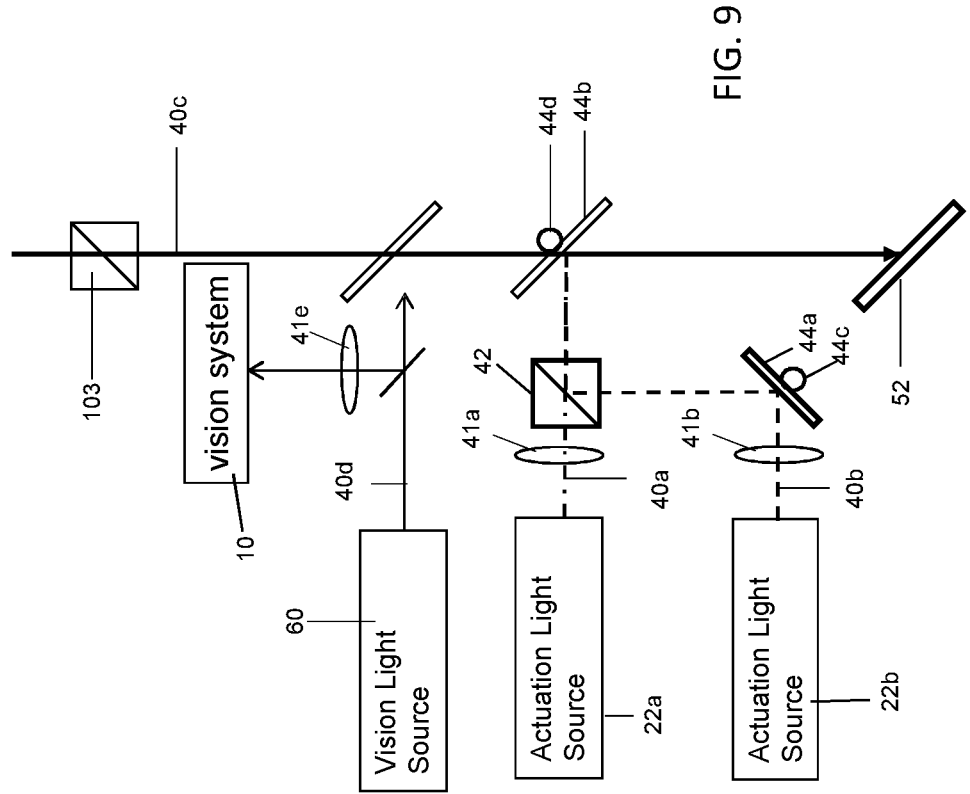
FIG. 9 shows the light sources for the vision system and probe actuation.

Actuation light sources 22a,b shown in FIG. 9 generate intensity-modulated radiation beams 40a,b which are directed via the steering mirror 13 onto the coated side of the cantilever, along with the detection beam 40c, as shown in FIG. 8. The wavelength of the light is selected for good absorption by the coating material. The objective lens 12 directs the beams 40a,b,c onto different locations on the cantilever 30.

The cantilever 30 is a thermal bimorph structure, the materials of which undergo differential expansion when heated. In one embodiment, the cantilever 30 is fabricated from silicon nitride with an aluminium coating. The actuation light sources 22a,b emit light of one or more wavelengths at which there is a maximum or peak in the absorption spectrum for the particular coating. For example the wavelength may be around the aluminium absorption peak at ~810 nm. Other coating/wavelength combinations can be used, for example gold has a higher absorption below 500 nm light. When this light is incident on the coating side of the cantilever 30, the aluminium expands to a greater degree than the silicon nitride, bending the cantilever such that the tip moves downwards, towards the surface of a sample 32. If illumination intensity is increased, the tip 31 therefore moves closer to the sample 32. Conversely, if the intensity is lowered, bending is decreased and the tip 31 is moved away from the sample. Clearly other arrangements of coating and base materials may result in different levels of bending in the same or opposite direction in response to illumination.

The microscope also has a lens driver 49, typically a motor, attached to the lens 12 which can move the lens 12 in the Z direction as well as the X and Y directions.

The light beam 40a from the first laser 22a is horizontally polarised, whilst the light beam 40b from the second laser 22b is vertically polarised. The output intensity emitted by both lasers 22a,b is independently controlled.

A polarising beam combiner 42 is arranged such that the polarised light 40a, 40b from the two lasers 22a,b is incident at respective faces and directed to exit at a single output face. Specifically, the beam combiner 42 has an internal mirror arranged at 45° relative to the beam 40a which reflects the S polarisation component of beam 40b but transmits the P polarisation component of beam 40a.

The fact that the beam 40b is S polarised and the beam 40a is P polarised is not to be taken as restrictive. Either polarisation can be used for either beam, or indeed circular polarisations. All that is required is that they are differently polarised in order for them to be combinable in the beam combiner 42.

A first motorised mirror 44a is steerable by a mirror actuator 44c about two orthogonal axes of rotation to ensure that light 40b from the second laser 22b enters the beam combiner 42 at the required angle and position. Thus the first mirror 44a can be adjusted so that the laser output beams 40a, 40b exit the combiner either substantially parallel or with a small angular difference—this angular difference being more apparent in FIG. 8.

A second motorised mirror 44b is oriented to direct the combined actuation beams 40a, 40b towards the mirror 52. The angle of the second mirror 44b can be adjusted with respect to two orthogonal axes by a mirror actuator 44d so that the laser output beams 40a,b enter the tracking system with a small angular difference relative to the detection beam 40c so that the three beams 40a,b,c fall on the mirror 52 with a small difference in angle between them. When the probe 30, 31 is scanned across the surface of the sample 32 by the first actuator 3, the steering mirror 13 is similarly scanned to ensure that the three beams 40a,b,c follow the probe xy position and yet retain their relative displacement.

After being reflected by the steering mirror 13, the beams 40a,b,c are simultaneously focused by the objective lens 12 onto the back of the cantilever 30. As the beams 40a,b,c enter the lens 12 at different angles they are focused on respective laterally displaced locations on the cantilever 30.

It will be appreciated by one skilled in the art that the system can be adapted to allow four, five or more light beams to track the moving cantilever.

FIG. 10 shows various further elements of the microscope 1 which are used in the imaging mode. The output of the detection system 26 (i.e. the height signal 116 and/or the deflection angle signal 117) is analysed by a processor 28 to extract information relating to the amplitude of probe oscillation. The processor 28 may alternatively be operated to extract other parameters indicative of probe position, for example deflection or phase. A feedback controller 30, in response to the measured oscillation amplitude, outputs a feedback signal 31 that is used to instruct adjustment of probe height Pz in order to maintain a constant oscillation amplitude on adjustment of the probe—sample separation. This adjustment of the probe position is referred to below as z-position feedback. An image collection processor 33 receives the feedback signal 31 from the feedback controller 30, which represents the information about the surface of the sample obtained by the microscope 1, and this, along with knowledge of the xy scan pattern, is used to construct a map of the sample 32. Typically the feedback signal and thus map provide height information about the surface of the sample.

Figure 12:
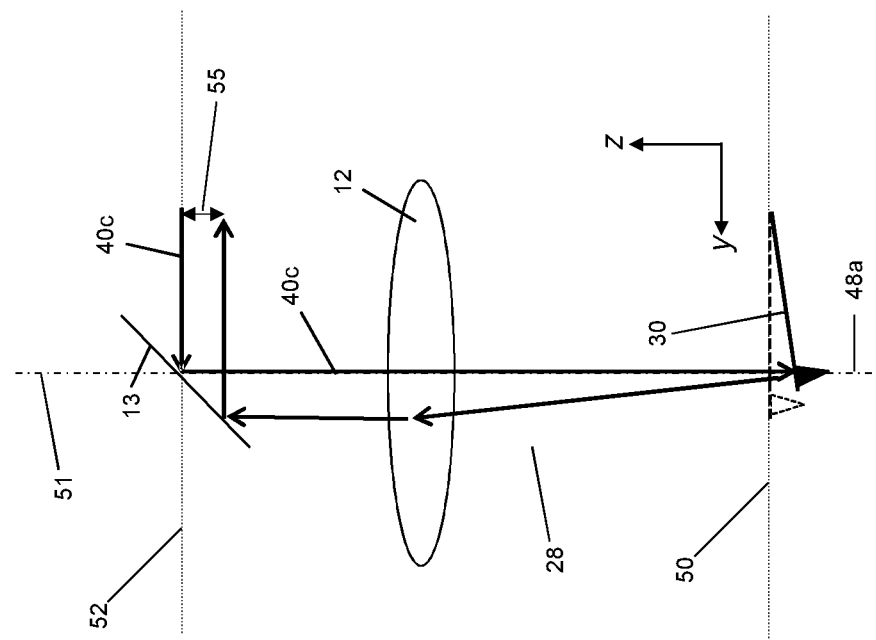
FIG. 12 shows the return beam offset caused by deflection of the cantilever.
Figure 11:
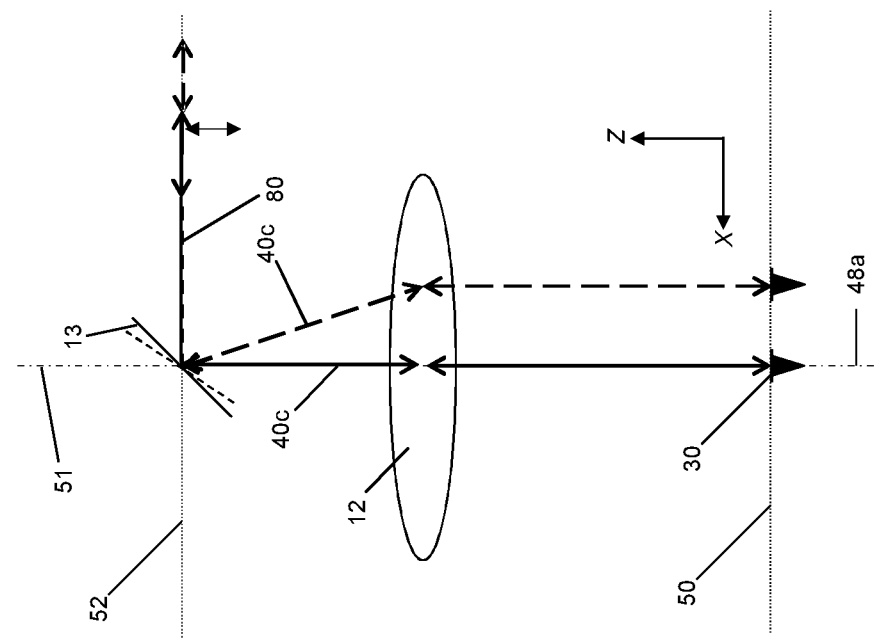
FIG. 11 shows the steering mirror in two positions tracking a scanning probe.
Figure 13:
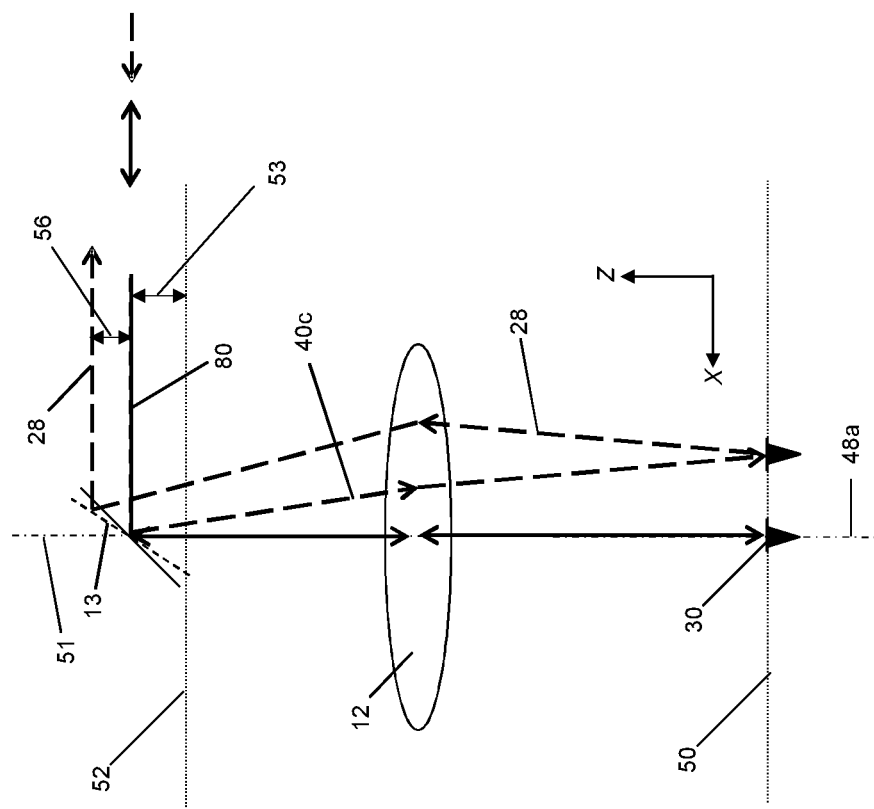
FIG. 13 shows the return beam offset caused by a pure rotation of the steering mirror if it is offset from the rear focal plane of the objective lens.

FIGS. 11-13 are schematic diagrams showing the desirability of placing the axis of rotation of the steering mirror 13 at the focal point of the objective lens 12 and in the plane of the steering mirror 13. Note that in FIGS. 11-20 only the detection beam 40c is shown for the purpose of simplifying the drawings. However the probe may also be illuminated with actuation beams as shown in FIG. 8 and light from the vision light source 60 as shown in FIG. 9.

In FIGS. 11-13, the cantilever 30 is in the front focal plane 50 of the lens 12. In FIGS. 11 and 12, the mirror 13 and its axis of rotation both lie at a rear focal point of the lens 12 (that is, a point where the optical axis 51 of the lens 12 intersects with its rear focal plane 52).

In FIG. 11 it can be seen that if the detection beam 40c is co-axial with the optical axis 51 of the lens 12 and impinges on the reflective upper surface of the cantilever 30 at right angles then the reflected return beam returns along the same optical path 80 before and after reflection by the mirror 13. If the steering mirror 13 is rotated to track the probe so that the detection beam 40c is no longer co-axial with the optical axis of the lens 12 or at right angles to the reflective upper surface of the cantilever 30, as indicated by the dashed line in FIG. 11, then the return beam remains co-axial with the detection beam after reflection by the steering mirror 13. So in the case of FIG. 11, the mirror 13 can be moved with a pure rotation (with no translation) in order to track the probe 30,31, the probe support 2 or any other feature following the scanning motion.

FIG. 12 shows the same optical arrangement of FIG. 11, but viewed from a different direction so the cantilever 30 is viewed from the side. The probe is shown in dashed lines with the cantilever 30 in a raised position in the front focal plane 50 of the lens 12, and in solid lines after the cantilever 30 has been deflected down having been heated by the actuation beams 40a, b. Due to the deflection of the cantilever 30, the detection beam 40c is no longer at right angles to the reflective upper surface of the cantilever 30, so the return beam 28 is no longer co-axial with the detection beam 40c and there is an offset 55 between the return beam 28 and the detection beam 40c. The deflection signal 117 from the split photodiode 104 measures this offset 55.

As mentioned above, in FIGS. 11 and 12 the mirror 13 and its axis of rotation both lie at a rear focal point of the lens 12 (that is, a point where the optical axis 51 of the lens 12 intersects with its rear focal plane 52). In the case of FIG. 13, the mirror and its axis of rotation are offset from the rear focal plane 52 by a mirror offset distance 53.

From FIG. 13 it can be seen that if the detection beam is co-axial with the optical axis of the lens 12 and impinges on the probe at right angles then the reflected beam returns along the same path 80 before and after reflection by the mirror 13. However if the mirror 13 is rotated to the position shown in dashed lines to track movement of the probe, then the return beam 28 becomes offset from the path 80 by a return beam offset 56, despite the fact that the deflection angle of the cantilever 30 has not changed. This return beam offset 56 is undesirable because it results in an error in the deflection signal 117. In other words, the return beam offset 56 gives a false indication that the deflection angle of the cantilever 30 has changed, when it has not.

Figure 14:
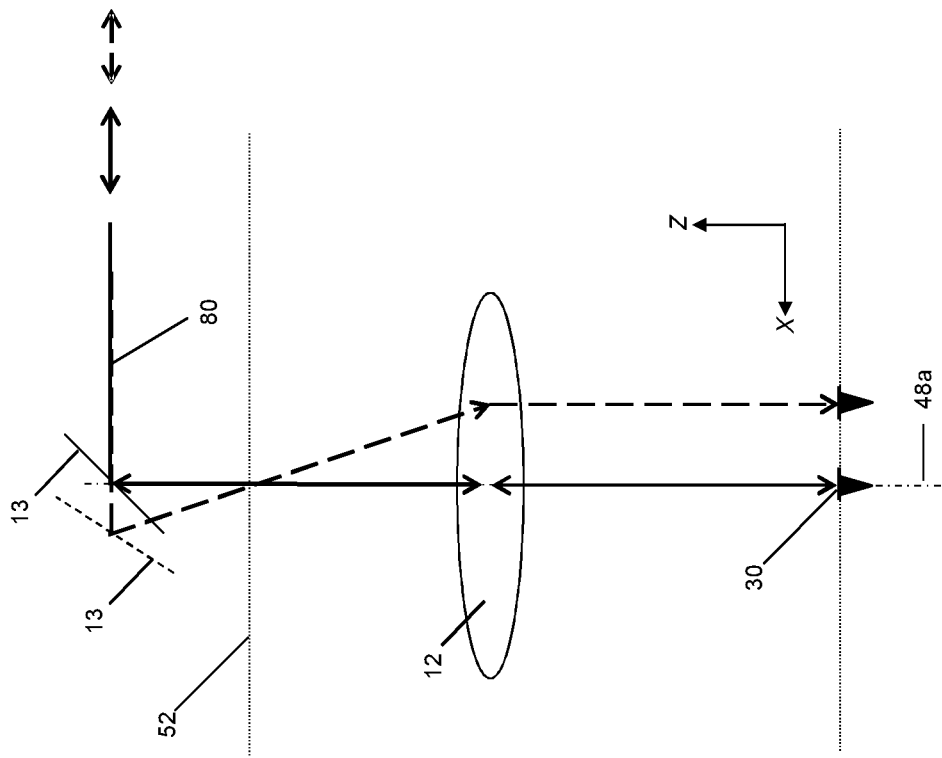
FIG. 14 shows the steering mirror offset from the rear focal plane of the objective lens and being translated and rotated in order to avoid return beam offset.

In some cases the construction of the objective lens 12, or other spatial limitations, may make it impossible to place the mirror 13 in the rear focal plane 52 of the objective lens 12. In this case the mirror 13 can be translated as well as rotated by the second actuator 14 so that the return beam does not shift from the path 80 due to movement of the mirror 13, as shown in FIG. 14.

Figure 16:
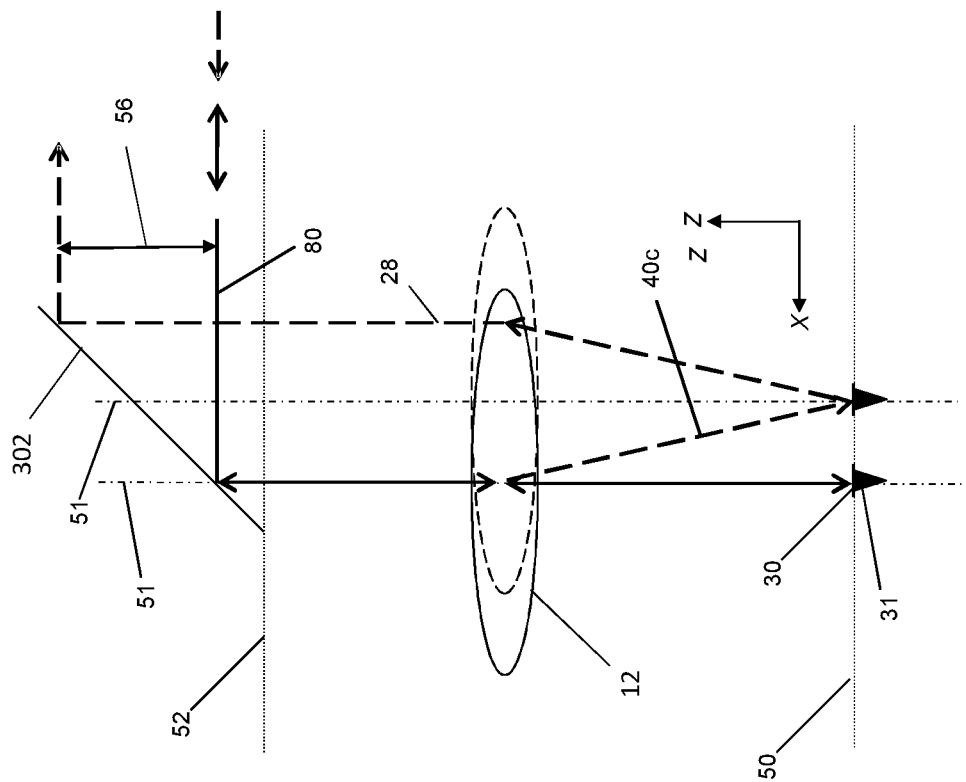
FIG. 16 shows the objective lens being translated to steer the detection beam and field of view.
Figure 15:
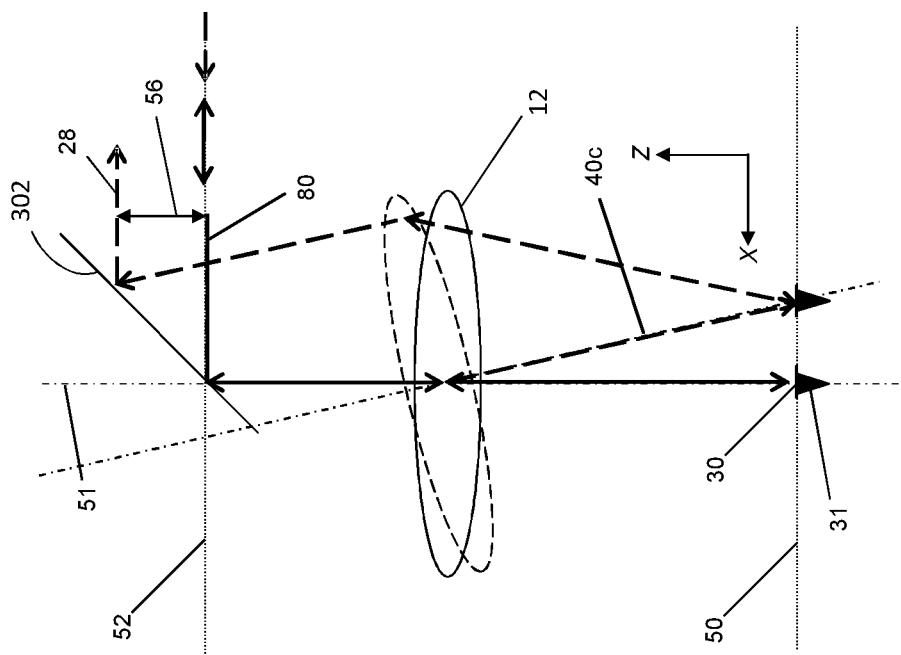
FIG. 15 shows the objective lens being rotated to steer the detection beam and field of view.

In the embodiments described above, beam steering is effected by movement of the steering mirror 13. FIGS. 15 and 16 show alternative arrangements in which the steering mirror 13 is replaced by a fixed mirror 302 which remains stationary, and beam steering is effected instead by movement of the objective lens 12.

FIG. 15 shows an arrangement in which beam steering is effected by rotation of the objective lens 12. The detection beam 40c is directed along the path 80. When the lens 12 is in the position shown in solid lines with its optical axis 51 in line with the path 80 and at right angles to the reflective upper surface of the cantilever 30, then the return beam follows the same path 80 after reflection by the mirror 302. When the probe moves to the right-hand position, the lens 12 is rotated to the orientation shown in dashed lines so that the detection beam 40c continues to be steered onto the cantilever 30 by the lens 12. This arrangement suffers from the same problem as the arrangement of FIG. 13, in that there is a return beam offset 56.

FIG. 16 shows an arrangement in which beam steering is effected by translation of the objective lens 12. The detection beam 40c is directed along the path 80. When the lens 12 is in the position shown in solid lines with its optical axis 51 in line with the path 80, then the return beam follows the same path 80 after reflection by the mirror 13. When the probe moves to the right-hand position, the lens 12 is translated to the position shown in dashed lines so that the detection beam 40c continues to be steered onto the cantilever 30 by the lens 12. This arrangement also suffers from the same problem as the arrangement of FIG. 13, in that there is a return beam offset 56.

Figure 17:
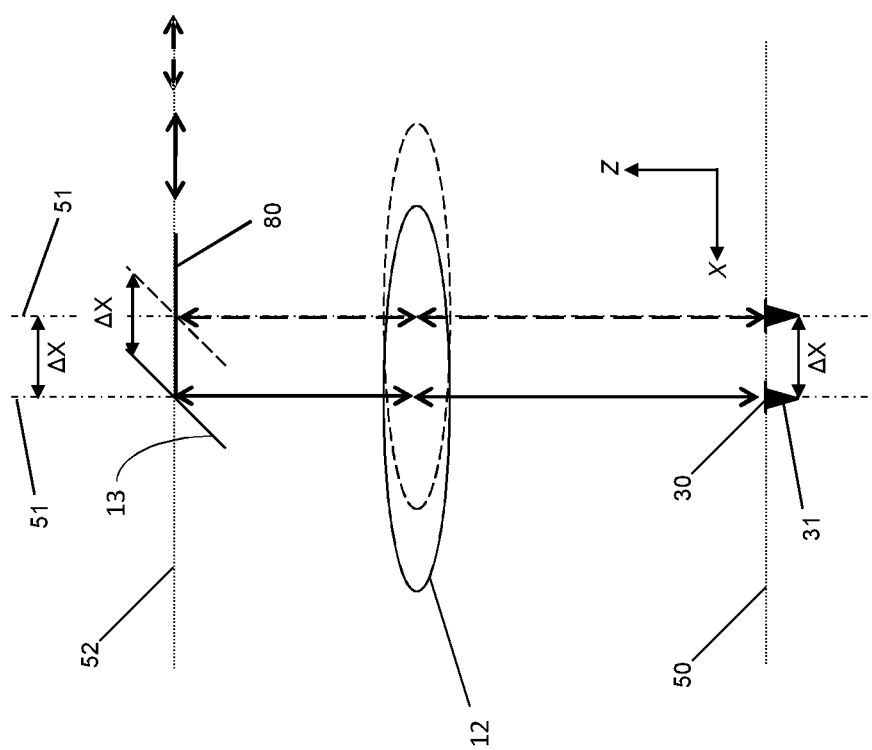
FIG. 17 shows the objective lens and the steering mirror being translated in tandem to steer the detection beam and field of view.

FIG. 17 shows an arrangement in which beam steering is effected by translation of the objective lens 12 and the steering mirror 13. The detection beam 40c is directed along the path 80. When the lens 12 is in the position shown in solid lines with its optical axis 51 in line with the path 80, then the return beam follows the same path 80 after reflection by the mirror 13. When the probe moves by a distance $\Delta X$ to the right-hand position, the lens 12 and the mirror 13 are both translated by the same distance $\Delta X$ to the position shown in dashed lines so that the detection beam 40c continues to be steered onto the cantilever 30 by the lens 12. Unlike FIGS. 15 and 16, there is no return beam offset 56, so the return beam follows the same path 80 as the detection beam after the return beam has been reflected by the steering mirror 13. A second steering mirror (not shown) is also provided, which directs the detection beam towards the steering mirror 13, and also receives the reflected return beam from the steering mirror 13. This second steering mirror can be translated in the Y-direction in order to track motion of the cantilever in the Y-direction (in and out of the plane of FIG. 17).

Figure 18:
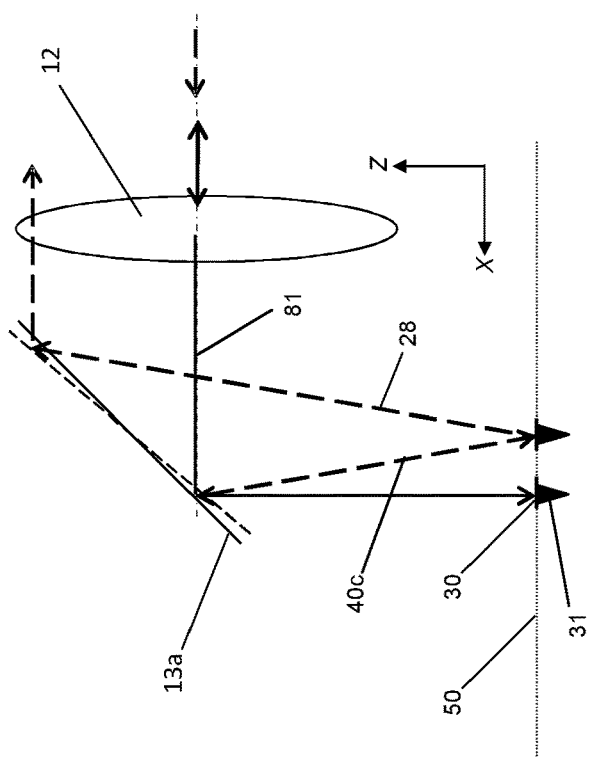
FIG. 18 shows an alternative location for the steering mirror.

FIG. 18 shows an arrangement in which beam steering is effected by rotation of a beam steering mirror 13a which is positioned in the optical path between the objective lens 12 and the probe 30, 31. The detection beam 40c is directed onto the mirror 13a by the objective lens 12 along a path 81. When the mirror 13a is in the position shown in solid lines, then the return beam follows the same path 81 after reflection by the mirror 13a. When the probe moves to the right-hand position, the mirror 13a is rotated to the orientation shown in dashed lines so that the detection beam 40c continues to be steered onto the cantilever 30 by the mirror 13a. This arrangement suffers from the same problem as the arrangement of FIG. 13, in that there is a return beam offset.

Figure 19:
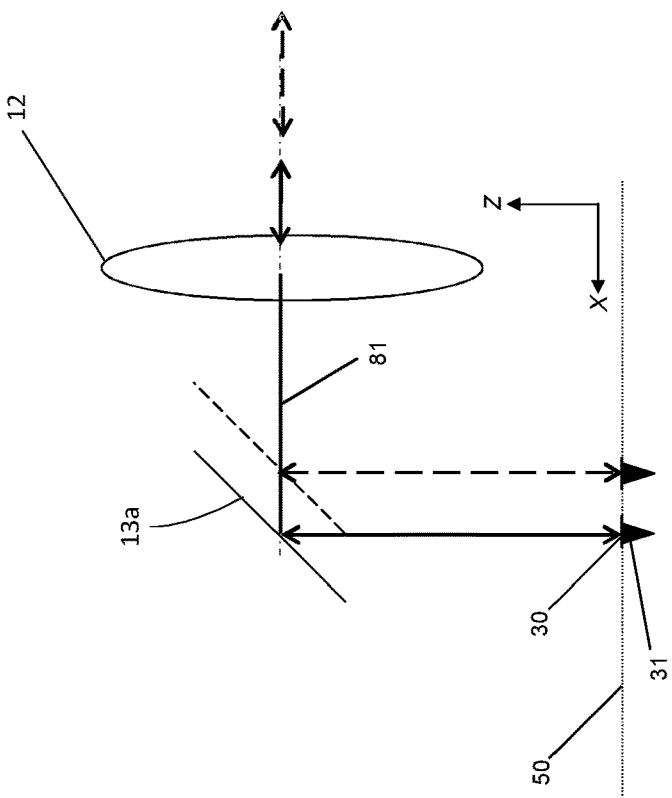
FIG. 19 shows the steering mirror in the alternative location being translated to steer the detection beam and field of view.

FIG. 19 shows an arrangement in which beam steering is effected by translation of the beam steering mirror 13a between the objective lens 12 and the probe 30, 31. When the probe moves to the right-hand position, the mirror 13a is translated to the position shown in dashed lines so that the detection beam 40c continues to be steered onto the cantilever 30 by the mirror 13a. Unlike FIGS. 15 and 16, there is no return beam offset so the return beam follows the same path 81 as the detection beam after the return beam has been reflected by the steering mirror 13a. A second steering mirror (not shown) is also provided, which directs the detection beam towards the steering mirror 13a, and also receives the reflected return beam from the steering mirror 13a. This second steering mirror can be translated in the Y-direction in order to track motion of the cantilever in the Y-direction (in and out of the plane of FIG. 19).

Figure 20:
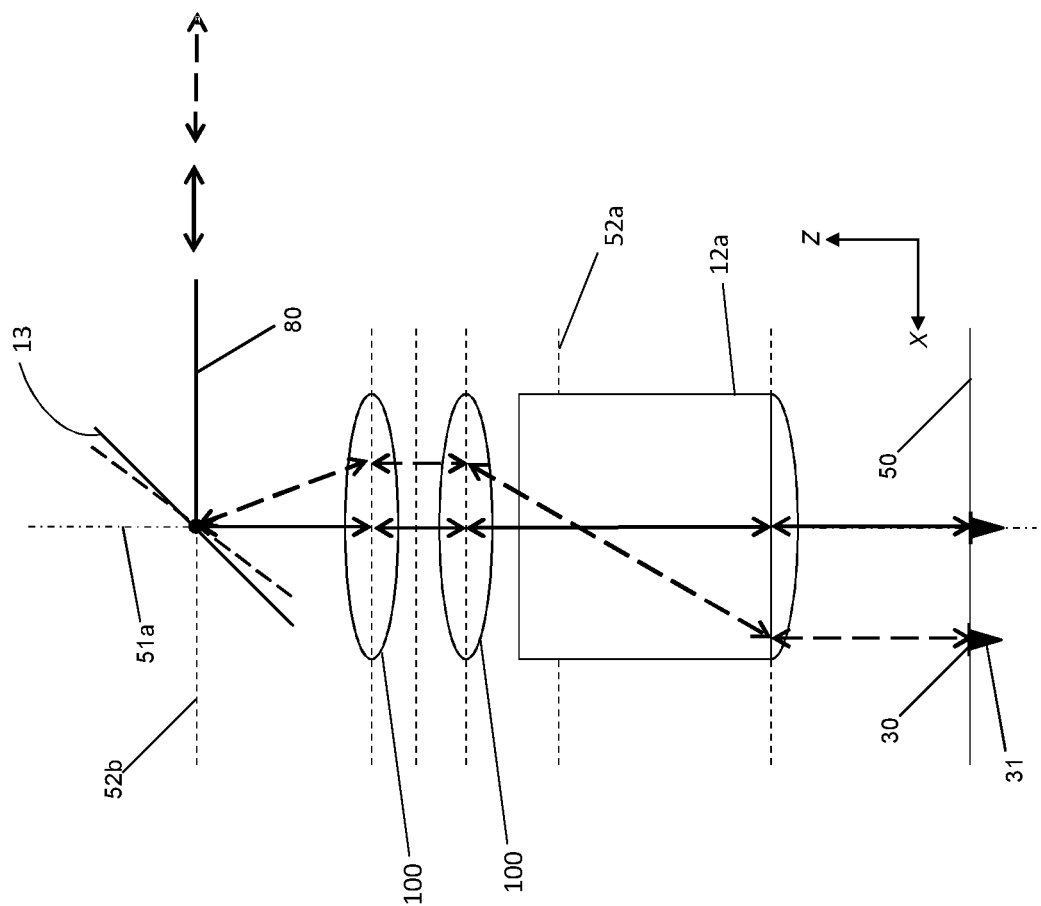
FIG. 20 shows an alternative arrangement with a pair of relay lenses creating an image of the rear focal plane of the objective lens.

FIG. 20 shows how the microscope 1 can be modified in the event that the rear focal plane 52 of the objective lens is not accessible. The microscope of FIG. 20 is identical to the microscope of FIG. 1, except that the objective lens 12 is replaced by an objective lens 12a with a rear focal plane 52a which is inside the spatial envelope of the objective lens 12a, so it is not possible to place the beam steering mirror 13 on the rear focal plane 52a.

A set of relay lenses 100 are positioned in the optical path between the objective lens 12a and the steering mirror 13. The relay lenses 100 are arranged to create an image 52b of the rear focal plane 52a of the objective lens. Since the image 52b of the rear focal plane is outside the spatial envelope of the objective lens 12a, the mirror 13 can be positioned at the image 52b of the rear focal plane 52a as shown in FIG. 20. As with the embodiment of FIG. 1, the mirror 13 is arranged to steer the detection beam onto the probe so that the probe reflects the detection beam to generate a return beam. The mirror 13 is positioned so that the detection beam travels from the mirror 13 to the probe via the relay lenses 100 and the objective lens 12a.

As with the embodiment of FIG. 1, the second actuator is configured to rotate the mirror 13 as shown in FIG. 20 so that the detection beam follows a tracking motion which is synchronous with the scanning motion and the detection beam remains steered onto the probe by the mirror 13. The mirror 13 and its axis of rotation both lie at a point where the optical axis 51a of the relay lenses 100 intersects with the image 52b of the rear focal plane 52a. As with FIG. 11, the return beam remains co-axial with the detection beam along optical path 80 after reflection by the steering mirror 13 so the mirror 13 can be moved with a pure rotation (with no translation) in order to track the probe.

Figure 21:
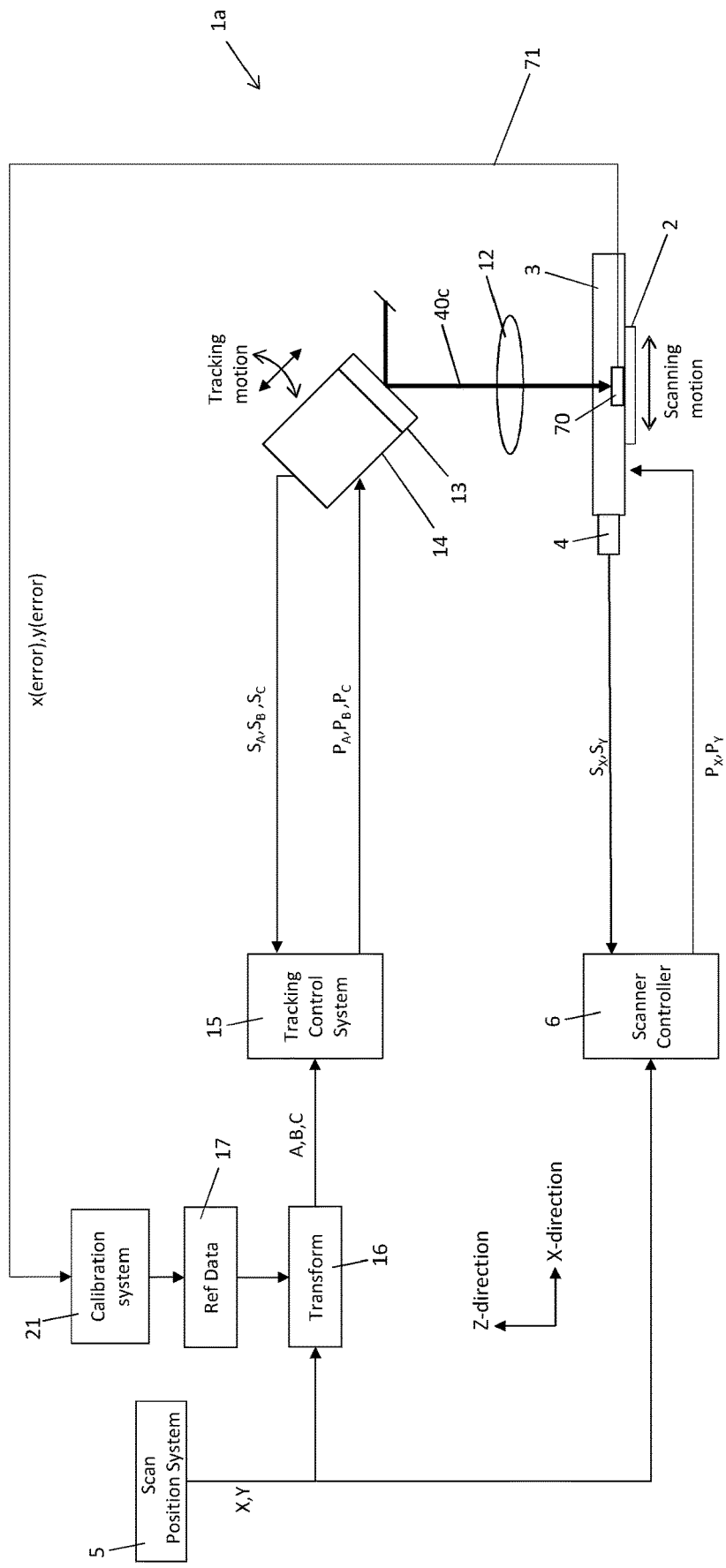
FIG. 21 shows various elements of an alternative scanning probe microscope in which the detection beam is directed onto a scanning split photodiode.

FIG. 21 shows a scanning probe microscope 1a which is similar to the microscope 1, and the same features are given the same reference numbers which will not be described again. A position sensitive detector 70 is mounted on the probe support 2, so that the first actuator 3 moves the position sensitive detector 70 along with the probe support 2 following the scanning motion.

The steering mirror 13 is configured to steer the detection beam 40c onto the position sensitive detector 70, and the position sensitive detector 70 is configured to generate an output 71 in accordance with an offset of the detection beam 40c relative to the position sensitive detector 70 in the X and Y directions. The offset relative to the centre of the position sensitive detector 70 is denoted x(error) and y(error) in FIG. 21 and is equivalent to the apparent motion measured by the image analysis system 20 in the embodiment of FIG. 1. Note that the detection system 26 is omitted from FIG. 21 since in this case there will be no return beam reflected by the position sensitive detector 70.

Typically the position sensitive detector 70 is a split photodiode which is split into four quadrants, the ratios between the signals from the four quadrants indicating offsets in the X and Y directions of the detection beam 40c relative to the centre of the split photodiode.

The second actuator 14 receives the tracking drive signals $P_A, P_B, P_C$ and moves the steering mirror on the basis of the tracking drive signals $P_A, P_B, P_C$ so that the detection beam 40c follows a tracking motion which is synchronous with the scanning motion and the detection beam 40c remains steered onto the position sensitive detector 70. The calibration system 21 is configured to adjust the stored reference data 17 based on the output 71 of the position sensitive detector 70, using a calibration process similar to FIG. 7 but omitting the step 210.

Figure 22B:
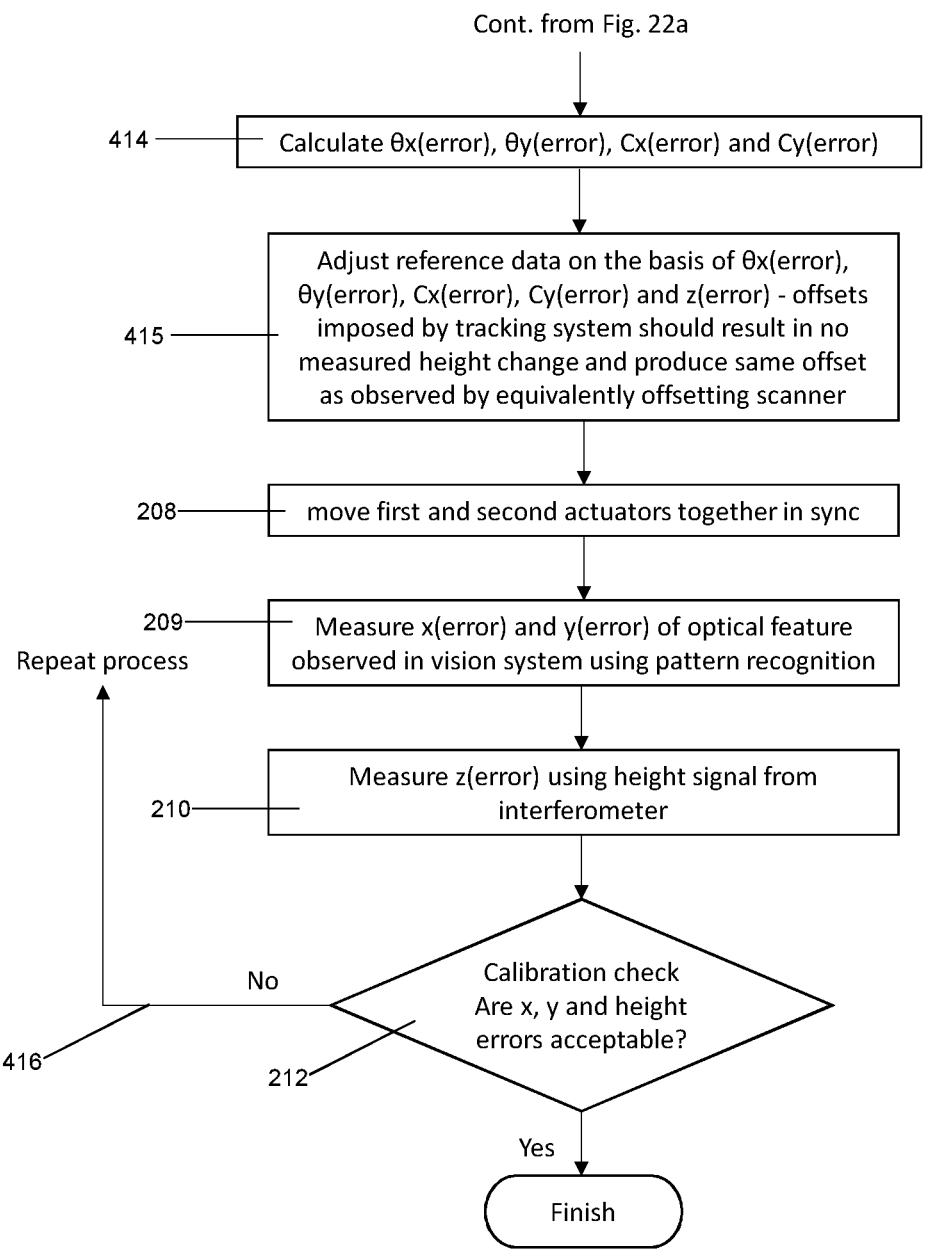

FIGS. 22a and 22b show an alternative calibration process. In the calibration process of FIG. 7, the first and second actuators are both moved in step 208 but in the alternative calibration process of FIGS. 22a and 22b they are moved in different steps.

Some of the steps in the process of FIGS. 22a and 22b are identical to equivalent steps in FIG. 7, and these steps will not be described in detail again. In step 202 an optical feature is aligned in the field of view of the vision system, and in step 204 the interferometer 105 is focused on the surface of the probe support 2.

In step 408 the scan position system 5 changes the scanning command signals X,Y by a known offset. This causes the first actuator 3 to generate a step change in the position of the optical feature. Unlike in the method of FIG. 7, the second actuator 14 does not move during step 408.

Figures 23A, 23B:
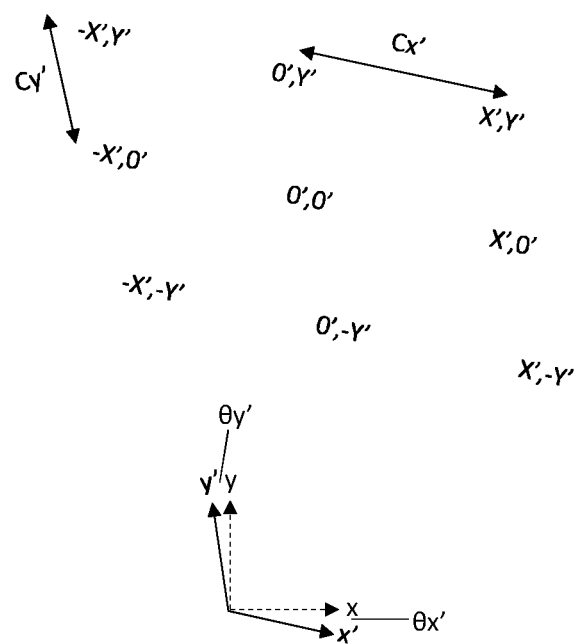
FIG. 23a shows an array of positions of the optical feature during the scanning phase of the alternative calibration mode.
FIG. 23b shows an array of apparent positions of the optical feature observed by the vision system during the scanning phase of the alternative calibration mode.

FIG. 23a shows an array of positions of the optical feature during the scanning phase of steps 408 and 409. During the initial steps 202 and 204 the probe support is at the central position labelled 0,0 in FIG. 23a. In the first instance of step 408, the optical feature moves to one of the other positions in the array (for example the position labelled X,0). This moves the optical feature by a known offset X to the right.

FIG. 23b shows the apparent position of the optical feature observed by the vision system 10 during the scanning phase of steps 408 and 409. After the first instance of step 408 the apparent position of the optical feature has moved from 0',0' to X',0'. In step 409 the x offset (X') and y offset (0') of the optical feature in the vision system are measured and stored.

Steps 408 and 409 are then repeated for the full array of FIG. 23a. note that FIG. 23a is schematic and the number of points in the array will be much greater in practice.

In step 410 the known offsets of the scanner and the measured offsets observed via the vision system in step 409 are analysed to determine a scanner coordinate system (x',y') relative to the vision system (x,y). FIG. 23b shows two sets of axes: an orthogonal set of axes (x,y) and a non-orthogonal set of axes (x',y'). These define an x-rotation (ex) and a y-rotation (θy). Scaling factors Cx and Cy shown in FIG. 23b are also determined by analysis of the measured offsets observed via the vision system.

In step 411 the scan position system 5 changes the scanning command signals X,Y to cause the second actuator 14 to generate a step change (ΔA,ΔB,ΔC) in the position or orientation of the tracking mirror 13. The first actuator 3 and the optical feature do not move during step 411. The tracking command signals A,B,C used in step 411 are generated by transforming the scanning command signals X,Y in accordance with provisional reference data 17.

Figure 24:
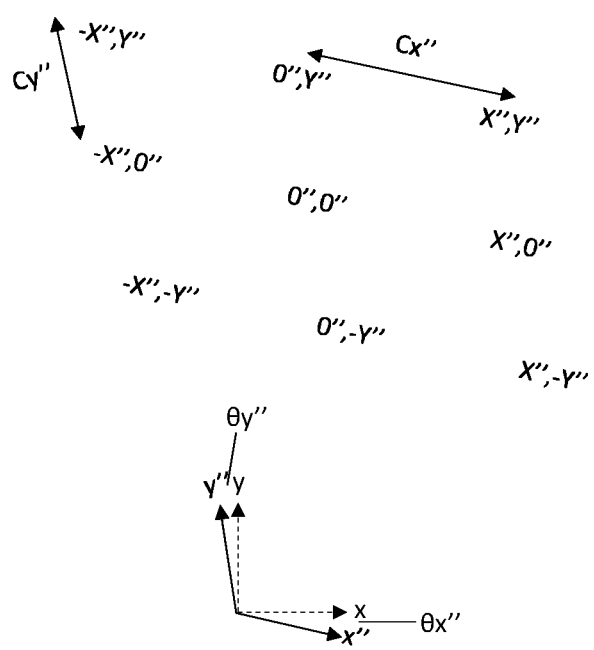
FIG. 24 shows an array of apparent positions of the optical feature observed by the vision system during a tracking phase of the alternative calibration mode.

FIG. 24 shows the apparent position of the optical feature observed by the vision system 10 during the tracking phase of steps 411 and 412. After the first instance of step 411, using the provisional reference data 17, the apparent position of the optical feature has moved from 0",0" to X",0". In step 412 the x offset (X") and y offset (0") of the optical feature in the vision system are measured and stored.

Variation in the height signal 116 from the interferometer 105 or the deflection angle signal 117 from the split photodiode 104 is determined in step 210—this variation being denoted as z(error).

In step 413 the measured offsets observed via the vision system are analysed to determine a tracker coordinate system (x",y") with an x-rotation (θx"), a y-rotation (θy"); and scaling factors Cx", Cy" shown in FIG. 24.

The reference data 17 represents a correlation between the scanning command signals X,Y and the tracking command signals A,B,C. If the provisional reference data 17 is perfectly accurate, then the apparent positions shown in FIG. 24 will be identical to the apparent positions shown in FIG. 23b, and the parameters (θx", θy", Cx", Cy") will be identical to the parameters (θx, θy, Cx, Cy).

Any differences between these parameters are recorded as errors (denoted θx(error), θy(error), Cx(error), Cy(error)) which are calculated in step 414 of FIG. 22b. In step 415 the reference data 17 is adjusted on the basis of θx(error), θy(error), Cx(error), Cy(error) and z(error) to provide new, improved reference data 17. The adjustment of step 415 improves the accuracy of the reference data 17 so that the offsets imposed by the tracking system should result in no measured height change, and produce the same offset as observed by equivalently offsetting the scanner.

After step 415, steps 208-210 of the process of FIG. 7 are performed as a cross-check. If the errors are not acceptable, then the process is repeated via return path 416.

Figure 25A:
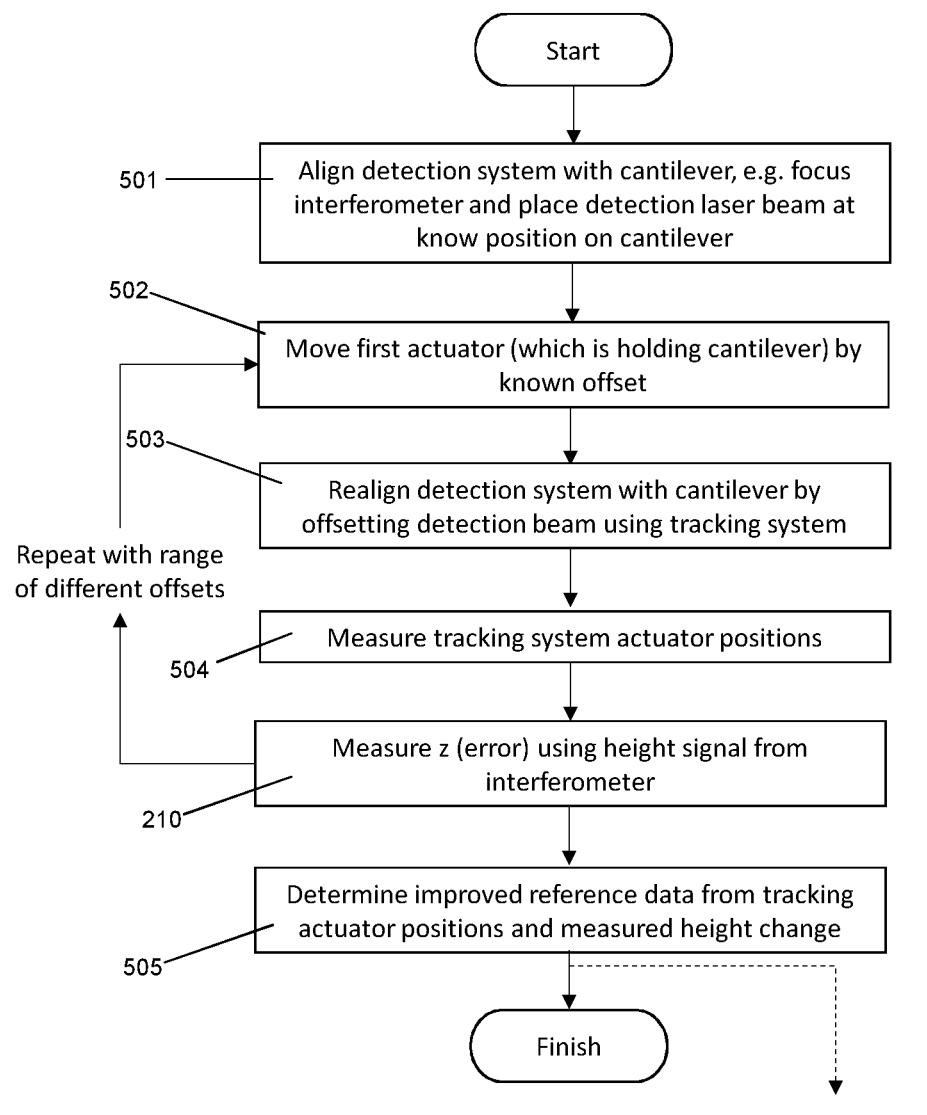

FIGS. 25a and 25b show a further alternative calibration process. In the calibration process of FIGS. 7 and 22a/b, the vision system is used. In the calibration process of FIGS. 25a and 25b, the vision system is not used. Thus the process of FIGS. 25a and 25b can be implemented in a microscope with no vision system.

Some of the steps in the process of FIGS. 25a and 25b are identical to equivalent steps in FIGS. 22a and 22b, and these steps will not be described in detail again.

In step 501 the detection system 26 is aligned with the cantilever 30 so that the detection beam 40c is focused and placed at a known position on the cantilever 30. The detection beam 40c is placed at the known position on the cantilever 30 as follows. First the beam 40c is scanned across the cantilever 30 (or vice versa) and the detection system 26 detects the two step changes in the detection signal as the detection beam 40c crosses the edge of the cantilever. The mid-point between these step changes gives the mid-line of the cantilever. Next the detection beam 40c is scanned lengthwise along the cantilever 30 (or vice versa) until a step change is detected when it crosses the distal end of the cantilever. The lengthwise scanning motion is then reversed by a known amount so that the beam is now positioned on the mid-line of the cantilever at a known distance from its distal end.

In step 502 the scan position system 5 changes the scanning command signals X,Y by a known offset. This causes the first actuator 3 to generate a step change in the position of the cantilever.

In step 503 the detection system is realigned with the cantilever 30 by offsetting the detection beam using the tracking control system 15, 16. More specifically: tracking command signals A,B,C are generated by transforming the scanning command signals X,Y in accordance with the reference data 17, and these tracking command signals A,B,C are used to drive the mirror 13 until the detection beam moves back to the known position on the cantilever (i.e. on the mid-line of the cantilever at a known distance from its distal end) using the process described above.

In step 504 the strain gauge feedback signals $S_A, S_B, S_C$ are recorded—these signals $S_A, S_B, S_C$ indicating the positions of the three struts of the second actuator 14.

Variation in the height signal 116 from the interferometer 105 or the deflection angle signal 117 from the split photo-diode 104 is determined in step 210—this variation being denoted as z(error).

In step 505, new, improved reference data 17 is determined based on the tracking actuator positions $S_A, S_B, S_C$ measured in step 504 and the height change z(error) measured in step 210. This new, improved reference data 17 represents a correlation between the scanning command signals X,Y and the tracking command signals A,B,C and is used later in the scanning or imaging mode.

Steps 502-504 and 210 are then repeated with a range of different offsets.

The process may then finish, or optionally may continue to the cross-check process of FIG. 25b which is similar to the cross-check process of FIG. 23b so will not be described again.

To sum up: in FIGS. 7, 22a/b and 25a/b the scanning probe microscope is operated in a calibration mode by: moving a feature (either an optical feature or the cantilever) in steps 208/408/502 with the first actuator on the basis of one or more scanning command signals X, Y; moving the steering element 13 in steps 208/401/503 with the second actuator on the basis of tracking command signals A,B,C; determining in steps 214/415/505 reference data 17 which represents a correlation between the scanning command signals X,Y and the tracking command signals A,B,C; and storing the reference data 17.

After the reference data 17 has been stored in the calibration mode as in FIGS. 7, 22a/b and 25a/b, the scanning probe microscope is operated in a scanning mode as shown in FIGS. 8-10. In the scanning mode the microscope is operated by steering a detection beam 40c onto the probe 30 with the steering element 13 so that the probe reflects the detection beam to generate a return beam 28; receiving the return beam 28 at the detection system 26 which generates the height signal 116 as an output; moving the probe with the first actuator 3 on the basis of scanning command signals X,Y so that the probe follows a scanning motion across the sample 32; generating tracking command signals A,B,C by transforming the one or more scanning command signals X,Y in accordance with the reference data 17; and moving the steering element 13 with the second actuator 14 on the basis of the tracking command signals A,B,C so that the detection beam 40c follows a tracking motion which is synchronous with the scanning motion and the detection beam remains steered onto the probe by the steering element 13.

The probe is scanned laterally across the surface of the sample 32 so that the probe follows a scanning motion across the surface. This scanning motion across the surface may be such that the probe follows a raster scanning motion in the x-y plane across the surface. The detection beam 40c is steered onto the probe via the steering mirror 13, the detection beam reflecting from the probe in the form of a return beam 28. The steering mirror 13 is moved so that the detection beam 40c follows a tracking motion which is synchronous with the scanning motion and the detection beam 40c remains steered onto the probe by the steering mirror 13.

For each point on the surface, an image measurement is obtained by the image collection processor 33 based on the output of the detection system 26. An associated height error measurement is also obtained for each image measurement. The image measurement provides an indication of the measured height at the point on the surface, and the height error measurement provides an indication of an error in the measured height. The image measurement and its associated height error measurement are obtained at the same time.

The height error measurements are based on mirror error measurements from the tracking controller 15. The second actuator 14 comprises three piezoelectric actuator struts 14a-c that are used to move the steering mirror 13, so three associated mirror error measurements are obtained per image measurement, i.e. one for each piezoelectric actuator strut. The three mirror error measurements are combined into a single height error measurement, for example by linearly combining the three mirror error measurements.

As stated above, each one of the struts 14a-c extends and contracts on the basis of a respective tracking drive signal. So the strut 14a is driven by the tracking drive signal $P_A$, the strut 14b is driven by the tracking drive signal $P_B$ and the strut 14c is driven by the tracking drive signal $P_C$.

The tracking control system 15, 16 is configured to generate the tracking drive signals $P_A, P_B, P_C$ in accordance with the stored reference data 17 and the scanning command signals X,Y. The tracking control system comprises the tracking controller 15 and the transform system 16.

Each one of the struts 14a-c has an associated strain gauge which generates a strain gauge feedback signal $S_A, S_B, S_C$. The tracking controller 15 generates the tracking drive signals $P_A, P_B, P_C$ on the basis of a set of tracking command signals A,B,C and the strain gauge feedback signals $S_A, S_B, S_C$ by operation of a feedback loop using a proportional-integral (PI) or proportional-integral-derivative (PID) controller 15a and mirror error signal 34 shown in FIG. 1. This feedback loop seeks to cause the second actuator 14 to drive the steering mirror 13 precisely to a desired position determined by the tracking command signals A,B,C, but the actual position is subject to an error as explained below.

Each mirror error measurement is indicative of a difference between an intended position of the steering mirror 13 (i.e. the position that the scanning command signals X,Y and tracking command signals A,B,C direct the steering mirror 13 to move to) and a real position of the steering mirror 13 (i.e. the actual position that the steering mirror moves to). This difference results from imperfect operation in the feedback loop that sends the tracking drive signals $P_A, P_B, P_C$ to the steering mirror 13. The tracking drive signals $P_A, P_B, P_C$ are sent to the steering mirror 13 so that it follows a tracking motion that is synchronous with the scanning motion of the probe across the surface. The detection beam 40c may trail behind its intended position, and the resulting image of the surface may therefore experience a bimodal error or some other systematic error across the image.

The real position of the steering mirror 13 is obtained by the tracking controller 15 using the signals $S_A, S_B, S_C$ from the strain gauges coupled to the piezoelectric actuator struts 14a-c of the steering mirror.

Given that each mirror error measurement is indicative of a difference between positions of the steering mirror 13, it is necessary to apply a conversion factor to this mirror error measurement so that it becomes indicative of an error in the measured height of the point on the surface of the sample. This conversion factor is the sensitivity, and is obtained by considering a point on a surface; observing an initial measured height; keeping two of the actuator struts 14b-c at a constant extension and extending the third actuator strut 14a by a known amount; and determining the corresponding observed change in the measured height. This determination is carried out with the interferometer 105. The sensitivity is then the conversion factor between the known actuator extension and the observed height change—i.e. the sensitivity can be obtained by dividing the known actuator extension by the observed height change, or by dividing the observed height change by the known actuator extension. For example, if an actuator strut 14a extends 10 nm and a corresponding height change of 1 nm is observed, the sensitivity may be 1 nm/10 nm=0.1. The same can be done for each of the remaining two actuator struts 14b-c, to obtain their respective sensitivities. This determination of the sensitivity is typically performed before a scan, as a calibration step. Alternatively, the sensitivity determination may be performed once (for example, as part of the original system calibration) or on a periodic basis. The sensitivity determination may also be performed without the probe, and by reflecting a detection beam from a surface instead of the probe. The reflected beam is collected by the interferometer.

The mirror error can then be multiplied or divided (depending on the particular quotient used to obtain the sensitivities) by each of the three sensitivities (corresponding to each of the three actuator struts 14a-c) to obtain three height errors. These height errors can then be added together to obtain the total height error in the height measurement.

FIG. 10 schematically indicates the process described above. The tracking controller (part of a control system shown in FIG. 10) outputs the mirror errors 34, which are combined and converted at 35, then low pass filtered at 36 to provide the height error measurements which are input to the image collection processor 33. The image collection processor 33 then applies the necessary height corrections based on the height error measurements.

All of the image measurements and associated height error measurements are obtained, and the sensitivity factor applied at 35, before the image measurements are corrected by the image collection processor 33. The image measurements may therefore not be corrected before the end of the scan. This is because the image measurements and associated error measurements are passed through the low pass filter 36 to reduce noise, before the image measurements are corrected. The noise can be more effectively filtered once the scan has been completed, as patterns in both the x and y axes can be discerned.

To summarise, the scan is completed, after which the sensitivity factor is applied at 35 followed by a low pass filter 36. Each height error measurement is then used to correct its associated image measurement, to generate a series of corrected image measurements. The series of corrected image measurements together give a corrected image.

Each of the electronic elements shown in the drawings and described in the text could be implemented as hardware, software, or anything else, including any combination of hardware and software, for example. By way of example: a single field-programmable gate array (FPGA) or digital signal processor (DSP), or multiple FPGAs or DSPs, could implement all of the electronic elements, or each electronic element could be implemented by a dedicated FPGA or DSP, or any combination of FPGAs or DSPs.

Although the invention has been described above with reference to one or more preferred embodiments, it will be appreciated that various changes or modifications may be made without departing from the scope of the invention as defined in the appended claims.

The invention claimed is:

1. A method of imaging a surface using a scanning probe microscope, the scanning probe microscope comprising a probe having a cantilever extending from a base to a free end, and a probe tip carried by the free end of the cantilever, and a steering mirror; the method comprising:
   scanning the probe laterally across the surface so that the probe follows a scanning motion across the surface;
   steering a detection beam onto the probe via the steering mirror, the detection beam reflecting from the probe in the form of a return beam;
   moving the steering mirror so that the detection beam follows a tracking motion which is synchronous with the scanning motion and the detection beam remains steered onto the probe by the steering mirror;

using the return beam to obtain image measurements, each image measurement being indicative of a measured height of a respective point on the surface;

obtaining an associated height error measurement for each point on the surface, each height error measurement being indicative of a respective error in the measured height; and using the height error measurements to correct the image measurements so as to generate corrected image measurements.

2. The method of claim 1, wherein obtaining an associated height error measurement comprises determining an intended position or orientation of the steering mirror based on a scanning command signal; measuring a real position or orientation of the steering mirror; and calculating a mirror error measurement indicative of a difference between the intended position or orientation and the real position or orientation, wherein the associated height error measurement is based on the mirror error measurement.

3. The method of claim 2, wherein obtaining an associated height error measurement further comprises applying a sensitivity parameter to the mirror error measurement.

4. The method of claim 3, wherein applying the sensitivity parameter to the mirror error measurement comprises multiplying or dividing the mirror error measurement by the sensitivity parameter.

5. The method of claim 4, wherein the sensitivity parameter is determined by moving the steering mirror by a known amount; determining an observed change in measured height; and dividing the known amount by the observed change or vice versa.

6. The method of claim 2, wherein the associated height error measurements are obtained by filtering the mirror error measurement measurements.

7. The method of claim 6, wherein the mirror error measurement measurements are filtered after all of the mirror error measurement measurements have been calculated.

8. The method of claim 1, wherein the image measurements and the associated error measurements are obtained at the same time.

9. The method of claim 1, wherein the step of using the height error measurement to correct each image measurement takes place after the scan has completed.

10. The method of claim 1, wherein moving the steering mirror comprises translating and/or rotating the steering mirror.

11. A scanning probe microscope comprising:

a probe having a cantilever extending from a base to a free end, and a probe tip carried by the free end of the cantilever;

a scanner arranged to scan the probe laterally across the surface so that the probe follows a scanning motion across the surface;

a steering mirror arranged to steer a detection beam onto the probe, the detection beam reflecting from the probe in the form of a return beam;

one or more actuators arranged to move the steering mirror so that the detection beam follows a tracking motion which is synchronous with the scanning motion and the detection beam remains steered onto the probe by the steering mirror; and a processing system arranged to:

use the return beam to obtain an image measurement for a point on the surface, the image measurement being indicative of a measured height of the point on the surface;

obtain an associated height error measurement for the point on the surface, the height error measurement being indicative of an error in the measured height; and use the height error measurement to correct the image measurement so as to generate a corrected measurement.

\* \* \* \* \*